(12) United States Patent
Sato

(10) Patent No.: US 10,754,049 B2
(45) Date of Patent: Aug. 25, 2020

(54) METHOD FOR CALIBRATING IMAGING MAGNIFICATION OF RADIATION COMPUTED TOMOGRAPHY SCANNER

(71) Applicant: Shimadzu Corporation, Kyoto (JP)

(72) Inventor: Makoto Sato, Kyoto (JP)

(73) Assignee: Shimadzu Corporation, Nishinokyo-Kuwabaracho, Nakagyo-ku, Kyoto-shi, Kyoto (JP)

(*) Notice: Subject to any disclaimer, the term of this patent is extended or adjusted under 35 U.S.C. 154(b) by 0 days.

(21) Appl. No.: 16/346,189

(22) PCT Filed: Oct. 3, 2017

(86) PCT No.: PCT/JP2017/035979
§ 371 (c)(1),
(2) Date: Apr. 30, 2019

(87) PCT Pub. No.: WO2018/083930
PCT Pub. Date: May 11, 2018

(65) Prior Publication Data
US 2019/0302285 A1    Oct. 3, 2019

(30) Foreign Application Priority Data
Nov. 1, 2016   (JP) .................. 2016-214231

(51) Int. Cl.
| | | |
|---|---|---|
| G01N 23/00 | (2006.01) | |
| G21K 5/08 | (2006.01) | |
| G01D 18/00 | (2006.01) | |
| G01T 7/00 | (2006.01) | |
| G01N 23/04 | (2018.01) | |
| G03B 42/02 | (2006.01) | |
| G06T 11/00 | (2006.01) | |
| H05G 1/26 | (2006.01) | |

(52) U.S. Cl.
CPC ............ *G01T 7/005* (2013.01); *G01N 23/04* (2013.01); *G03B 42/02* (2013.01); *G06T 11/003* (2013.01); *H05G 1/26* (2013.01)

(58) Field of Classification Search
USPC .................. 378/4, 19, 20, 57, 68, 207, 208
See application file for complete search history.

(56) References Cited

U.S. PATENT DOCUMENTS 5,119,408 A * 6/1992 Little .................. G01N 23/046
                                                378/10
5,319,693 A * 6/1994 Eberhard ............... A61B 6/032
                                                378/19

(Continued)

FOREIGN PATENT DOCUMENTS

JP     2002-131246 A    5/2002
JP     2013-217773 A   10/2013

*Primary Examiner* — Irakli Kiknadze
(74) *Attorney, Agent, or Firm* — Muir Patent Law, PLLC

(57) ABSTRACT

A distance SRD can be obtained from sizes of projection images of a calibration instrument on a table at a first point (that is an imaging position) and a second point and a distance between rotation center axes of the table at the first point and the second point. Furthermore, a distance SDD can be obtained by adding up the distance SRD thus obtained and a distance between an X-ray detector and the rotation center axis of the table at the first point, and a ratio between the distances SRD, SDD is taken as an imaging magnification of imaging at the first point.

9 Claims, 5 Drawing Sheets

(56) References Cited

U.S. PATENT DOCUMENTS

| | | | | |
|---|---|---|---|---|
| 7,714,304 B2* | 5/2010 | Poglitsch | ............ | G01N 23/046 |
| | | | | 250/370.09 |
| 7,760,852 B2* | 7/2010 | Chen | ............ | A61B 6/587 |
| | | | | 378/19 |
| 9,025,855 B1* | 5/2015 | Christoph | ............ | G01N 23/046 |
| | | | | 382/152 |
| 9,739,729 B2* | 8/2017 | Feser | ............ | G01N 23/046 |
| 2008/0094592 A1* | 4/2008 | Shibazaki | ............ | G03F 7/70341 |
| | | | | 355/53 |
| 2008/0212734 A1* | 9/2008 | Kasperl | ............ | G01T 1/2985 |
| | | | | 378/4 |
| 2009/0074136 A1* | 3/2009 | Kamegawa | ............ | G01N 23/046 |
| | | | | 378/20 |
| 2010/0145653 A1* | 6/2010 | Christoph | ............ | G01B 21/04 |
| | | | | 702/152 |

* cited by examiner

METHOD FOR CALIBRATING IMAGING MAGNIFICATION OF RADIATION COMPUTED TOMOGRAPHY SCANNER

TECHNICAL FIELD

The present invention relates to a method for calibrating an imaging magnification of a radiation computed tomography scanner.

BACKGROUND ART

A radiation computed tomography (CT) scanner (CT scanner) used as an industrial CT scanner such as a non destructive inspection apparatus mainly includes the following three components. That is, such a CT scanner includes a radiation source configured to emit radiation, a table on which a subject is placed, the table being rotatable about a rotation center axis, and a radiation detector facing the radiation source with the table interposed between the radiation detector and the radiation source.

Any subject is placed on the table, and the table is rotated about the rotation center axis while causing the radiation source to emit radiation, thereby performing tomographic imaging. The radiation transmitted through the subject is detected by the radiation detector, and then reconstruction processing is performed on a plurality of projection images captured by the radiation detector to obtain a tomographic image of the subject. Here, on the basis of the distance from the radiation source to the rotation center axis of the table (SRD: Source-to-Rotation center Distance) and the distance from the radiation source to the radiation detector (SDD: Source-to-Detector Distance), an imaging magnification of the projection images can be defined as SDD/SRD. Therefore, accurately obtaining the imaging magnification allows dimensions of the tomographic image of the subject to be accurately grasped.

In practice, a focal position of the radiation source varies due to thermal expansion of a target that generates radiation, and properties of the radiation source such as a focal diameter also vary with a radiation condition. This causes the SDD and the SRD to vary. Therefore, unless the SDD and the SRD are accurately obtained, it is impossible to accurately grasp the dimensions of the tomographic image of the subject. In other words, when the SDD and the SRD are not accurate values, the dimensions of the obtained tomographic image of the subject deviate from a true value.

To cope with this, there are techniques of correctly obtaining the SDD and the SRD to calibrate the imaging magnification (e.g., refer to Patent Literature 1 and Patent Literature 2). As shown in FIG. 7, a linear drive mechanism MC that linearly moves a table T along an axis (also referred to as an "emitting axis") connecting a radiation source S and a center of a radiation detector D is provided, and an appropriate calibration instrument (also referred to as a "dedicated instrument" or simply referred to as an "instrument") whose relative position with respect to a rotation center axis is known is placed on the table T. In a technique disclosed in Patent Literature 1: JP 4396796 B2, after an image of the instrument is captured at a certain point, the instrument is linearly moved to a different point by the linear drive mechanism MC together with the table T along the emitting axis, and then another image of the instrument is captured. As described above, the image of the instrument is captured at the two points, allowing the SDD and the SRD at a specific position to be calibrated by a geometric operation. Note that in such a conventional calibration method, an instrument whose design dimension is known is used.

Further, in a technique disclosed in Patent Literature 2: JP 2013-217773 A, a shielding member having a surface inclined toward a specific focal position is disposed close to the radiation detector. When the specific focal position varies in an emitting axis direction in FIG. 11 of Patent Literature 2 (a Z direction in FIG. 11) or in a horizontal direction in FIG. 13 of Patent Literature 2 (a Y direction in FIG. 13) orthogonal to the emitting axis, a thickness of a shadow formed by the shielding member varies as shown in FIGS. 12 and 14 of Patent Literature 2. It is possible to obtain, from this shadow, a varying focal position or a reduction rate of a projection image.

CITATION LIST

Patent Literature

Patent Literature 1: JP 4396796 B2 (FIG. 1)
Patent Literature 2: JP 2013-217773 A (pages 21 and 22, FIGS. 11 to 14)

SUMMARY OF INVENTION

Technical Problem

However, since such a conventional method is based on the premise that the design dimension of the above-described instrument used in calibration is known, there is a problem that high shape accuracy of the calibration instrument is required to accurately obtain the imaging magnification.

That is, in the calibration as disclosed in Patent Literature 1: JP 4396796 B2, a projection dimension (inter-pixel distance) of the instrument on the projection image is actually measured. In order to accomplish highly accurate detection with the radiation detector for obtaining the projection image, it is preferable that the instrument be as close as possible to the radiation source. This makes it necessary to miniaturize the instrument, and thus makes it difficult to require high shape accuracy of the instrument. As described above, it is desired to accurately obtain the SDD and the SRD even for an instrument that does not require high shape accuracy, an instrument whose design dimension is unknown, or a subject that is subject to tomographic imaging.

The present invention has been made in view of the above circumstances, and an object of the present invention is to provide a method for calibrating an imaging magnification of a radiation computed tomography scanner capable of accurately calibrating an imaging magnification even with any calibration instrument or subject that is subject to tomographic imaging.

Solution to Problem

In order to achieve the object, the present invention is configured as follows.

That is, a method for calibrating an imaging magnification of a radiation computed tomography scanner according to the present invention, the radiation computed tomography scanner including a radiation source configured to emit radiation, a table on which a target object is placed, the table being rotatable about a rotation center axis and linearly movable in an emitting axis direction of the radiation between a first point that is an imaging position and a second point that is different from the first point, and a radiation detector facing the radiation source with the table interposed between the radiation detector and the radiation source, the radiation computed tomography scanner being configured to rotate the table about the rotation center axis to obtain a plurality of projection images and create a CT image, includes obtaining a distance SRD between a focal point of the radiation source and the rotation center axis of the table at the first point based on (a) a size of a projection image or a CT image of the target object on the table at the first point and a size of a projection image or a CT image of the target object on the table at the second point and (b) a distance between the rotation center axis of the table at the first point and the rotation center axis of the table at the second point, obtaining a distance SDD between the focal point of the radiation source and the radiation detector by adding up the distance SRD thus obtained and (c) a distance between the radiation detector and the rotation center axis of the table at the first point, and setting a ratio between the distances SRD, SDD thus obtained as an imaging magnification of imaging at the first point.

Operation and Effect

By the method for calibrating an imaging magnification of a radiation computed tomography scanner according to the present invention, in order to calibrate the imaging magnification of the radiation computed tomography scanner, the table rotates about the rotation center axis to obtain a plurality of projection images and the distances SRD, SDD are obtained using the following parameters of (a) to (c).

(a) is a size of a projection image or a CT image of the target object on the table at the first point (that is the imaging position) and a size of a projection image or a CT image of the target object on the table at the second point (different from the first point). (b) is a distance between the rotation center axis of the table at the first point and the rotation center axis of the table at the second point. The distance SRD can be obtained based on the parameters of (a), (b).

In the present invention, based on the premise that the following parameter of (c) is known or basically known, the distance SDD can be obtained without using a parameter corresponding to a known design dimension of a calibration instrument as used in the conventional method. (c) is a distance between the radiation detector and the rotation center axis of the table at the first point (that is the imaging position).

Therefore, when the distance SRD is accurately obtained based on the parameters of (a), (b), the focal position of the radiation source is also accurately obtained, allowing the distance SDD to be accurately obtained only by adding up the distance SRD accurately obtained and the parameter of (c). Taking the ratio between the distances SRD, SDD thus obtained as an imaging magnification at the first point allows the imaging magnification to be accurately calibrated. That is, even when the target object is a calibration instrument whose dimensions are unknown or a subject that is subject to tomographic imaging, it is possible to accurately calculate the distances SRD, SDD and the imaging magnification using such a calibration instrument or subject. As a result, even when any calibration instrument or a subject that is subject to tomographic imaging is used, the imaging magnification can be accurately calibrated.

In the present invention, even when the focal position of the radiation source varies with time, the parameter (distance) of (c) does not vary with time and can be regarded as being constant. A difference between a distance SDD at a calibration time t and a distance SRD at the calibration time t can be regarded as the distance of (c) (that is, the distance between the radiation detector and the rotation center axis of the table at the first point). Therefore, even at any calibration time t, the difference can be regarded as being constant irrespective of variations in the focal point of the radiation source, and the difference can be regarded as being equal to a difference between an SDD calibrated at a time before the calibration time t and an SRD calibrated at the time. As a result, the distances SRD, SDD can be each obtained by solving an equation in which the difference between the distance SDD at the calibration time t and the distance SRD at the calibration time t is equal to the difference between the SDD calibrated at the time before the calibration time t and the SRD calibrated at the time. As described above, the distances SRD, SDD and the imaging magnification can be accurately obtained by solving the equation in which the parameter (distance) of (c) is unknown, but is constant without varying with time.

The projection image or the CT image used for obtaining the imaging magnification may be an image obtained before and after tomographic imaging of the subject, and the CT image may be an image of the calibration instrument obtained concurrently with tomographic imaging of the subject. Obtaining the projection image or the CT image before and after tomographic imaging of the subject corresponds to obtaining the projection image or the CT image in a state where the properties of the radiation source have not changed from when the tomographic imaging of the subject is performed. When the CT image of the calibration instrument is obtained concurrently with tomographic imaging of the subject, the CT image of the subject through tomographic imaging of the subject and the CT image of the calibration instrument used for obtaining the imaging magnification can be obtained concurrently in the state where the properties of the radiation source have not surely changed. In order to obtain the CT image of the calibration instrument concurrently with tomographic imaging of the subject, the table is positioned at the first point that is the imaging position, and tomographic imaging is performed with the subject and the calibration instrument concurrently placed on the same table.

Examples of a specific aspect for obtaining each of the distances SRD, SDD include the following aspects (first to fifth aspects).

The projection image is a projection image of the calibration instrument captured by the radiation detector with the calibration instrument placed on the table to make a relative position with respect to the rotation center axis known, the distance SRD is obtained by a geometric operation using a size corresponding to the (a) of the projection image of the calibration instrument on the table at the first point and a size corresponding to the (a) of the projection image of the calibration instrument on the table at the second point and the distance of (b), and the distance SDD is obtained by adding up the distance SRD thus obtained and the distance of (c) (first aspect).

In the first aspect, the sizes corresponding to the parameters of (a) of the projection images of the calibration instrument on the table at the first point and the second point are actual measurement values captured by the radiation detector, and the distance corresponding to the parameter of (b) between the rotation center axis of the table at the first point and the rotation center axis of the table at the second point is known. Therefore, the distance SRD can be accurately obtained by the geometric operation using the parameters of (a) and (b). The distance SDD can also be accurately obtained only by adding up the distance SRD thus obtained and the parameter of (c).

Further, to obtain the distance SRD based on the image sizes of (a) and the distance of (b), a relative position of the calibration instrument with respect to the rotation center axis is obtained from pixel coordinates of the calibration instrument reflected in the CT image captured through tomographic imaging performed by the radiation detector with the calibration instrument placed on the table at the first point, the projection image is a projection image of the calibration instrument captured by the radiation detector, the distance SRD is obtained by a geometric operation using a size corresponding to the (a) of the projection image of the calibration instrument on the table at the first point and a size corresponding to the (a) of the projection image of the calibration instrument on the table at the second point, the distance of (b), and (d) the relative position of the calibration instrument with respect to the rotation center axis, and the distance SDD is obtained by adding up the distance SRD thus obtained and the distance of (c) (second aspect).

In the first aspect, the relative position with respect to the rotation center axis is known, but in the second aspect, the relative position with respect to the rotation center axis is unknown. Therefore, the CT image of the calibration instrument is obtained through tomographic imaging performed by the radiation detector with the calibration instrument placed on the table at the first point. The relative position of the calibration instrument with respect to the rotation center axis is obtained from pixel coordinates of the calibration instrument reflected in the CT image. With the relative position of the calibration instrument with respect to the rotation center axis taken as the parameter of (d), the distance SRD can be accurately obtained by the geometric operation using the parameter of (d) in the second aspect in addition to the parameters of (a) and (b) in the first aspect. The distance SDD can also be accurately obtained only by adding up the distance SRD thus obtained and the parameter of (c).

Further, to obtain the distance SRD based on the image sizes of (a) and the distance of (b), a structure of the subject is obtained from the CT image of the subject captured through tomographic imaging performed by the radiation detector with the subject placed on the table at the first point, the structure indicating a size corresponding to the (a) of the CT image of the subject captured at the first point, the projection image is (A) an actually measured projection image that is projected from the structure of the subject and captured by the radiation detector with the table positioned at the second point that is distanced from the first point by the distance of (b) and (B) a simulation projection image that is projected from the structure of the subject with the table positioned at the second point that is distanced from the first point by the distance of (b) while moving the focal point of the radiation source in a pseudo manner, matching between the actually measured projection image of (A) and the simulation projection image of (B) is performed while moving the focal point of the radiation source in a pseudo manner to make the actually measured projection image of (A) and the simulation projection image of (B) identical in size to each other, a distance between the focal point of the radiation source and the rotation center axis of the table at the first point when the matching between the simulation projection image of (B) and the actually measured projection image of (A) is accomplished is obtained as the distance SRD, and a distance between the focal point of the radiation source and the radiation detector when the matching between the simulation projection image of (B) and the actually measured projection image of (A) is accomplished is obtained as the distance SDD by adding up the distance SRD thus obtained and the distance of (C) (third aspect).

In the first or second aspect, an image (the projection image of the calibration instrument or the CT image of the calibration instrument) obtained through imaging or tomographic imaging performed on the calibration instrument serving as the target object is provided for use in the calibration of the imaging magnification. On the other hand, in the third aspect, the image (the projection image of the subject or the CT image of the subject) obtained through imaging or tomographic imaging performed on the subject serving as the target object that is subject to tomographic imaging is provided for use in the calibration of the imaging magnification. Therefore, from the CT image captured through tomographic imaging performed by the radiation detector with the subject placed on the table at the first point, the structure of the subject indicating the size corresponding to the parameter of (a) of the CT image of the subject at the first point is obtained. When the table is positioned at the second point that is distanced from the first point by the distance corresponding to the parameter of (b), the actually measured projection image that is projected from the structure of the subject and captured by the radiation detector is obtained.

At this time, since the CT image of the subject does not use the SRD, SDD to be calibrated, the structure of the subject indicating the size of the CT image of the subject is enlarged or reduced relative to the actual CT image of the subject. Furthermore, since the subject that is subject to tomographic imaging is any subject whose dimensions are unknown, it is not easy to obtain actual dimensions of the subject only from the actually measured projection image that is projected from the structure of the subject and captured by the radiation detector. Therefore, when the table is positioned at the second point that is distanced from the first point by the distance corresponding to the parameter of (b), the simulation projection image that is projected from the structure of the subject while moving the focal point of the radiation source in a pseudo manner is used. In order to make the actually measured projection image of (A) and the simulation projection image of (B) identical in size to each other, matching between the actually measured projection image of (A) and the simulation projection image (B) is performed while moving the focal point of the radiation source in a pseudo manner.

Note that when the matching between the actually measured projection image of (A) and the simulation projection image of (B) is performed with the position of the table fixed at the first point (that is, at the same point as where tomographic imaging is performed), a degree of freedom of magnification prevents not only the SRD but also the SDD from being calibrated. In order to eliminate this degree of freedom, it is necessary to make the distance between different points (the distance between the rotation center axis of the table at the first point and the rotation center axis of the table at the second point), that is, the distance corresponding to the parameter of (b), known. The distance between the focal point of the radiation source and the rotation center axis of the table at the first point when the matching between the simulation projection image of (B) and the actually measured projection image of (A) is accomplished can be accurately obtained as the distance SRD. The distance between the focal point of the radiation source and the radiation detector when the matching between the simulation projection image of (B) and the actually measured projection image of (A) is accomplished can be accurately obtained as the distance SDD only by adding up the distance SRD thus obtained and the parameter of (c).

Further, the CT image is a CT image of the calibration instrument that is captured through tomographic imaging performed by the radiation detector with the calibration instrument placed on the table, the distance SRD is obtained by a geometric operation using a size corresponding to the (a) of the CT image of the calibration instrument on the table at the first point, a size corresponding to the (a) of the CT image of the calibration instrument on the table at the second point and the distance of (b), and the distance SDD is obtained by adding up the distance SRD thus obtained and the distance of (c) (fourth aspect).

In the first, second, or third aspect, at least the projection image is provided for use in the calibration of the imaging magnification. On the other hand, in the fourth aspect, only the CT image of the calibration instrument is provided for use in the calibration of the imaging magnification. As with the CT image of the subject in the third aspect, since the CT image of the calibration instrument does not use the SRD, SDD to be calibrated, the CT image of the calibration instrument is enlarged or reduced relative to the actual CT image of the calibration instrument. In other words, when the CT image is obtained based on accurately calibrated SRD, SDD, the CT image having actual dimensions can be obtained regardless of the position (imaging position) of table. However, SRD, SDD that have not been calibrated do not have correct values due to variations in the focal position of the radiation source. Therefore, when the SRD, SDD that have not been calibrated are used, the size of the CT image varies with the position (imaging position) of table.

The sizes corresponding to the parameters of (a) of the CT images of the calibration instrument on the table at the first point and the second point are actual measurement values captured through tomographic imaging by the radiation detector, and the distance corresponding to the parameter of (b) between the rotation center axis of the table at the first point and the rotation center axis of the table at the second point is known. Therefore, the distance SRD can be accurately obtained by the geometric operation using the parameters of (a) and (b). The distance SDD can also be accurately obtained only by adding up the distance SRD thus obtained and the parameter of (c).

Further, the CT image is (C) a CT image captured through tomographic imaging performed by the radiation detector with the subject placed on the table at the first point, and (D) a CT image captured through tomographic imaging performed by the radiation detector with the subject placed on the table at the second point that is distanced from the first point by the distance of (b), matching between simulation CT images of (E) at the first point and the second point is performed while moving the focal point of the radiation source in a pseudo manner with a position of the table fixed at each of the first point and the second point where the tomographic imaging is performed to make the CT images identical in size to each other, a distance between the focal point of the radiation source and the rotation center axis of the table at the first point when the matching between the simulation CT images of (E) at the first point and the second point is accomplished is obtained as the distance SRD, and a distance between the focal point of the radiation source and the radiation detector when the matching between the simulation CT images of (E) at the first point and the second point is accomplished is obtained as the distance SDD by adding up the distance SRD thus obtained and the distance of (C) (fifth aspect).

In the first or second aspect, an image (the projection image of the calibration instrument or the CT image of the calibration instrument) obtained through imaging or tomographic imaging performed on the calibration instrument serving as the target object is provided for use in the calibration of the imaging magnification. On the other hand, in the fifth aspect, the image (the CT image of the subject) obtained through tomographic imaging performed on the subject serving as the target object that is subject to the tomographic imaging is provided for use in the calibration of the imaging magnification as in the third aspect. Therefore, the CT image of the subject is captured through tomographic imaging performed by the radiation detector with the subject placed on the table at the first point. Further, the CT image of the subject is captured through tomographic imaging performed by the radiation detector with the subject placed on the table at the second point.

At this time, since the CT image of the subject does not use the SRD, SDD to be calibrated, the CT image of the subject is enlarged or reduced relative to the actual CT image of the subject. In other words, as described in the fourth aspect, when the CT image is obtained based on accurately calibrated SRD, SDD, the CT image having actual dimensions can be obtained regardless of the position (imaging position) of table. However, SRD, SDD that have not been calibrated do not have correct values due to variations in the focal position of the radiation source. Therefore, when the SRD, SDD that have not been calibrated are used, the size of the CT image varies with the position (imaging position) of table.

Furthermore, as described in the third aspect, since the subject that is subject to tomographic imaging is any subject whose dimensions are unknown, it is not easy to obtain actual dimensions of the subject only from the CT image of the subject captured through tomographic imaging performed by the radiation detector. Therefore, the CT image of (C) captured through tomographic imaging performed by the radiation detector with the subject placed on the table at the first point, and the CT image (D) captured through tomographic imaging performed by the radiation detector with the subject placed on the table at the second point that is distanced from the first point by the distance corresponding to the parameter of (b) are each obtained, and the following matching is performed to make the CT images identical in size to each other.

That is, the matching between the simulation CT images of (E) at the first point and the second point is performed while moving the focal point of the radiation source in a pseudo manner with the position of the table fixed at the first point and the second point where the tomographic imaging is performed. The distance between the focal point of the radiation source and the rotation center axis of the table at the first point when the matching between the simulation CT images of (E) at the first point and the second point is accomplished can be accurately obtained as the distance SRD. The distance between the focal point of the radiation source and the radiation detector when the matching between the simulation CT images of (E) at the first point and the second point is accomplished can be accurately obtained as the distance SDD only by adding up the distance SRD thus obtained and the parameter of (c).

Advantageous Effects of Invention

By the method for calibrating an imaging magnification of a radiation computed tomography scanner according to the present invention, the distance SRD can be obtained based on (a) the size of the projection image or the CT image of the target object on the table at the first point (that is the imaging position) and the size of the projection image or the CT image of the target object on the table at the second point (different from the first point) and (b) the distance between the rotation center axes of the table at the first point and the second point. Furthermore, the distance SDD can be obtained by adding up the distance SRD thus obtained and the distance between the radiation detector and the rotation center axis of the table at the first point (that is the imaging position), and the imaging magnification can be calibrated by taking the ratio between the distances SRD, SDD thus obtained as the imaging magnification at the first point. As a result, any calibration instrument or tomographic imaging

DESCRIPTION OF EMBODIMENTS

First Embodiment

Hereinafter, a first embodiment of the present invention will be described with reference to the drawings.

Figure 1:
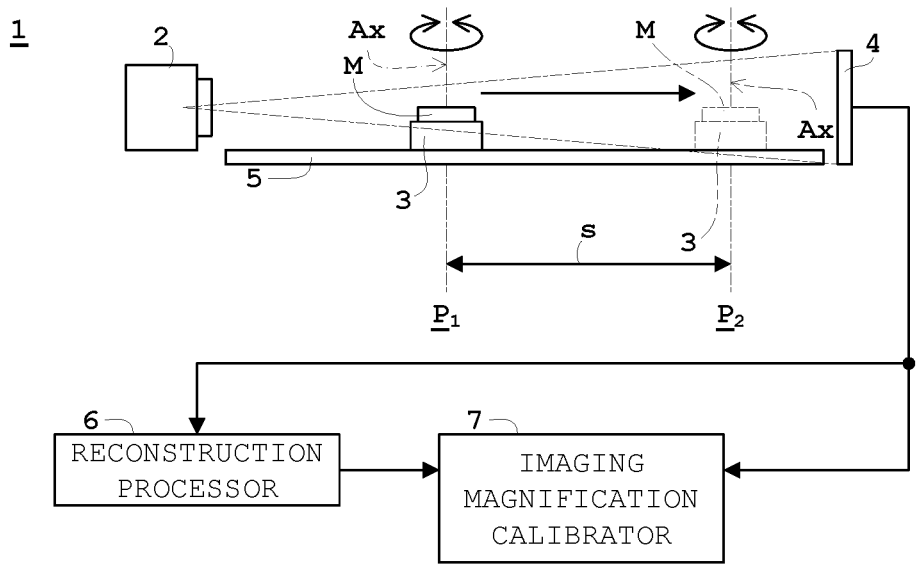
FIG. 1 is a schematic side view of an X-ray computed tomography scanner according to each embodiment.

FIG. 1 is a schematic side view of an X-ray computed tomography scanner according to each embodiment. In the first embodiment in addition to second to fifth embodiments (to be described later), description will be given in which X-rays are taken as an example of the radiation, and an X-ray computed tomography scanner is taken as an example of the radiation computed tomography scanner.

In the first embodiment in addition to the second to fifth embodiments (to be described later), as shown in FIG. 1, an X-ray computed tomography scanner 1 includes an X-ray tube 2 configured to emit X-rays, a table 3 on which a target object such as a subject M or a calibration instrument I (see FIG. 2) is placed, the table 3 being rotatable about a rotation center axis Ax and linearly movable in an X-ray emitting axis direction, and an X-ray detector 4 facing the X-ray tube 2 with the table 3 interposed between the X-ray detector 4 and the X-ray tube 2, the X-ray detector 4 being configured to detect the X-rays emitted from the X-ray tube 2. The X-ray computed tomography scanner 1 further includes a linear drive mechanism 5, a reconstruction processor 6, and an imaging magnification calibrator 7. The X-ray tube 2 corresponds to the radiation source in the present invention, the table 3 corresponds to the table in the present invention, and the X-ray detector 4 corresponds to the radiation detector in the present invention.

The X-ray detector 4 is not particularly limited, and may a detector such as an image intensifier (I.I) or a flat panel X-ray detector (FPD: Flat Panel Detector). However, it is preferable that a flat panel X-ray detector (FPD) having a surface with less distortion be used as the X-ray detector 4. In the first embodiment in addition to the second to fifth embodiments (to be described later), description will be given of the FPD as an example of the X-ray detector 4.

The FPD includes a plurality of detection elements that are arranged vertically and horizontally and each correspond to a pixel. The FPD causes the detection elements to detect X-rays and outputs data (electric charge signal) of the X-rays thus detected as an X-ray detection signal. As described above, the X-ray tube 2 emits the X-rays toward the target object, and the X-ray detector 4 that is the FPD detects the X-rays and outputs the X-ray detection signal. Then, a projection image is obtained by arranging pixel values based on the X-ray detection signal such that each of the pixel value is associated with a corresponding pixel (detection element).

The linear drive mechanism 5 moves the table 3 linearly along an axis (emitting axis) connecting the X-ray tube 2 and a center of the X-ray detector 4. The configuration of the linear drive mechanism 5 is not particularly limited, and the linear drive mechanism 5 may be constituted by, for example, a screw shaft or a guide member. The linear drive mechanism 5 moves the table 3 by a distance s (see also FIG. 2) indicated by a long dashed double-short dashed line in FIG. 1, allowing imaging or tomographic imaging to be performed at each point.

Therefore, before and after tomographic imaging of the subject M, it is possible to cause the linear drive mechanism 5 to move the table 3 on which the subject M or the instrument I is placed and to perform imaging or tomographic imaging at two points indicated by a solid line in FIG. 1 and the long dashed double-short dashed line in FIG. 1. A point indicated by the solid line in FIG. 1 is taken as an imaging position and defined as a first point (denoted by $P_1$). Further, a point indicated by the long dashed double-short dashed line in FIG. 1 is defined as a second point (denoted by $P_2$) that is different from the first point $P_1$. Then, a projection image obtained through the imaging or a CT image (a tomographic image or a reconstructed image) obtained through the tomographic imaging as in the second to fifth embodiments (to be described later) is sent to the imaging magnification calibrator 7 for use in the calibration of the imaging magnification (to be described later).

The reconstruction processor 6 performs reconstruction processing on a plurality of projection images that are captured by the X-ray detector 4 while the X-ray tube 2 is emitting X-rays and the table 3 is rotating about the rotation center axis Ax to obtain a CT image (a tomographic image or a reconstructed image). This accomplishes the tomographic imaging. Specific examples of an algorithm of the reconstruction processing include well-known algorithms such as a filtered back projection (FBP) algorithm and an iterative reconstruction algorithm, and therefore description thereof will be omitted.

The imaging magnification calibrator 7 calibrates the imaging magnification using the projection image captured by the X-ray detector 4 or the CT image reconstructed by the reconstruction processor 6. A specific operation of the imaging magnification calibrator 7 will be described later. The reconstruction processor 6 and the imaging magnification calibrator 7 are constituted by a central processing unit (CPU) or the like. Note that the reconstruction processor 6 may be constituted by a graphics processing unit (GPU) or the like.

Figure 2:
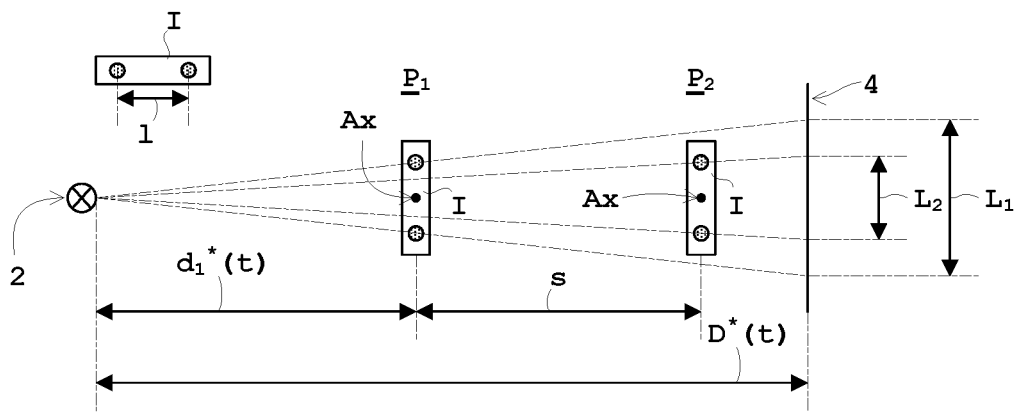
FIG. 2 is a schematic plan view of a focal point of an X-ray tube, a rotation center axis, a calibration instrument (instrument), and a detection surface of an X-ray detector that are used in calibration of an imaging magnification according to a first embodiment.

Next, a specific operation of the imaging magnification calibrator 7 (see FIG. 1) according to the first embodiment will be described with reference to FIG. 2. FIG. 2 is a schematic plan view of a focal point of the X-ray tube, the rotation center axis, the calibration instrument (instrument), and a detection surface of the X-ray detector that are provided for use in the calibration of the imaging magnification according to first embodiment. In FIG. 2, the illustration of the table is omitted, and only the focal point of the X-ray tube and the detection surface of the X-ray detector are illustrated.

In the first embodiment, before and after the tomographic imaging of the subject M (see FIG. 1), the instrument I is placed on the table 3 to make a relative position of the instrument I with respect to the rotation center axis Ax known without changing properties of the radiation source (see FIG. 1), and the imaging of the instrument I is performed by the X-ray detector 4 at the two points (the first point $P_1$ and the second point $P_2$) where the table 3 is positioned. As described above, before and after the tomographic imaging of the subject M, the linear drive mechanism 5 moves the table 3 on which the instrument I is placed (see FIG. 1), and the imaging is performed at the two points (the first point $P_1$ and the second point $P_2$) indicated by the solid line in FIG. 1 and the long dashed double-short dashed line in FIG. 1. The order of the imaging at the first point $P_1$ and at the second point $P_2$ is not particularly limited. The imaging of the instrument I may be performed at the second point $P_2$ after the imaging of the instrument I is performed at the first point $P_1$ that is the imaging position, or alternatively the imaging of the instrument I may be performed at the first point $P_1$ that is the imaging position after the imaging of the instrument I is performed at the second point $P_2$. Through the imaging of the instrument I, the projection image of the instrument I is obtained.

Here, examples of a condition where the properties of the radiation source are not changed include a condition where a tube voltage and a tube current of the X-ray tube 2 are constant. While the tube voltage and the tube current at the time of the tomographic imaging are constant through before and after the tomographic imaging of the subject M, the imaging of the instrument I is performed. Note that the condition where the properties of the radiation source are not changed is not limited to the condition where the tube voltage and the tube current are constant. The condition for the properties of the radiation source may be set in accordance with a specification or type of the X-ray tube. For example, the condition for the properties of the radiation source may change depending on switch-on or switch-off of a main power supply of the X-ray tube. In such a case, while the main power supply of the X-ray tube is kept on through before and after the tomographic imaging of the subject, the imaging of the instrument I is performed. There is another case where a target of the X-ray tube varies due to thermal expansion caused by long emission from the X-ray tube, causing a focal diameter to vary. In such a case, a time during which thermal expansion does not occur is set in advance, and the imaging of the instrument I is performed during the time thus set (during which thermal expansion does not occur) through before and after the tomographic imaging of the subject.

Here, even when a design dimension of the instrument I is unknown, it is possible to accurately calibrate an SDD and an SRD for a reason to be described later and thus accurately calibrate the imaging magnification. It is needless to say that the design dimension of the instrument I may be known. In either case, it is preferable that the instrument I be made of an axially symmetric structure (sphere, cylinder, or cone) or a thin plate that allows feature point detection. Further, it is preferable that the instrument I be made from a material that highly contrasts with air in the projection image.

A distance SRD between the focal point of the X-ray tube 2 and the rotation center axis Ax of the table 3 at the first point $P_1$ calibrated at a past reference time is denoted by $d_1$, and a distance SDD between the focal point of the X-ray tube 2 and the X-ray detector 4 calibrated at the reference time is denoted by $D_0$. Herein, the reference time is not particularly limited as long as it is before target calibration, and may be, for example, a time of shipment of the X-ray computed tomography scanner 1 (see FIG. 1). However, the properties of the radiation source change every time the tomographic imaging is performed, and thus it is preferable that the calibration according to the present invention (including the first embodiment and the like) be performed every time the tomographic imaging is performed, and the SRD calibrated immediately before the target calibration be $d_1$ and the SDD calibrated immediately before the target calibration be $D_0$. The $d_1$ and $D_0$ thus set are temporary values.

Further, as shown in FIG. 2, a distance between the rotation center axes Ax of the table 3 at the first point $P_1$ and the second point $P_2$ (see FIG. 1) is denoted by s (see also FIG. 1), and sizes of projection images of the instrument I on the table 3 at the first point $P_1$ and the second point $P_2$ are denoted by $L_1$ and $L_2$, respectively. In FIG. 2, the instrument I is made of an axially symmetric structure having two markers that highly contrast with air in the projection image and between which the emitting axis passes through, and projection dimensions (inter-pixel distances) between the two markers on the projection image are denoted by $L_1$, $L_2$. For the sake of convenience, the design dimension (the distance between the markers in FIG. 2) of the instrument I is denoted by l. Since the design dimension of the instrument I may be unknown as described above, the design dimension l of the instrument I may be either known or unknown.

Further, as shown in FIG. 2, an SRD to be calibrated is represented by $d_1^*(t)$, and an SDD to be calibrated is represented by $D^*(t)$. t denotes a calibration time, and unknown $d_1^*(t)$ and $D^*(t)$ can be each regarded as a function of the time t. A geometric operation using the distance s between the rotation center axes Ax of the table 3 at the first point $P_1$ and the second point $P_2$, the sizes $L_1$, $L_2$ of the projection images of the instrument I on the table 3 at the first point $P_1$ and the second point $P_2$ is represented by the following equations (1), (2).

$$D^*(t)/d_1^*(t) \times l = L_1 \qquad (1)$$

$$D^*(t)/(d_1^*(t)+s) \times l = L_2 \qquad (2)$$

Bringing together the above equations (1), (2) using $D^*(t) \times l$ results in the following equation (3).

$$(D^*(t) \times l) = L_1 \times d_1^*(t) = L_2 \times (d_1^*(t) + s) \quad (3)$$

As is apparent from the above equation (3), the SRD ($d_1^*(t)$) to be calibrated can be obtained by the following equation (4) without using the design dimension l of the instrument I.

$$d_1^*(t) = s \times L_2/(L_1 - L_2) \quad (4)$$

The sizes $L_1$, $L_2$ of the projection images of the instrument I in the above equation (4) are actual measurement values, and the distance s between the rotation center axes Ax of the table 3 at the first point $P_1$ the second point $P_2$ is known. Therefore, the SRD ($d_1^*(t)$) to be calibrated can be obtained by the above equation (4).

On the other hand, a difference ($D^*(t) - d_1^*(t)$) between the SDD ($D^*(t)$) at the calibration time t and the distance SRD ($d_1^*(t)$) at the calibration time t can be regarded as a distance between the X-ray detector 4 and the rotation center axis Ax of the table 3 at the first point $P_1$. Therefore, even at any calibration time t, the difference ($D^*(t) - d_1^*(t)$) can be regarded as being constant irrespective of variations in the focal point of the X-ray tube 2, and the difference ($D^*(t) - d_1^*(t)$) can be regarded as being equal to the difference ($D_0 - d_1$) between the SDD ($D_0$) calibrated at a past reference time and the SRD ($d_1$) calibrated at the reference time. As a result, an equation in which the difference ($D^*(t) - d_1^*(t)$) between the SDD ($D^*(t)$) at the calibration time t and the distance SRD ($d_1^*(t)$) at the calibration time t is equal to the difference ($D_0 - d_1$) between the SDD ($D_0$) calibrated at the past reference time and the SRD ($d_1$) calibrated at the reference time is represented by the following equation (5).

$$D^*(t) - d_1^*(t) = D_0 - d_1 \quad (5)$$

The SDD ($D^*(t)$) is obtained by solving the above equation (5). Specifically, the SDD ($D^*(t)$) is obtained by adding up the SRD ($d_1^*(t)$) already obtained and a parameter ($D_0 - d_1$) that is equal to the distance between the X-ray detector 4 and the rotation center axis Ax of the table 3 at the first point $P_1$ using an equation ($D^*(t) = d_1^*(t) + \{D_0 - d_1\}$) that is a transformation of the above equation (5). A ratio SDD/SRD between the distance SRD ($d_1^*(t)$) and SDD ($D^*(t)$) obtained as described above is defined as the imaging magnification (calibrated imaging magnification).

By the method for calibrating an imaging magnification according to the first embodiment, when the imaging magnification of the radiation computed tomography scanner (the X-ray computed tomography scanner in each embodiment) that rotates the table 3 about the rotation center axis Ax to obtain a plurality of projection images and create a CT image is calibrated, the distances SRD, SDD are obtained using the following parameters (a) to (c).

(a) is the size $L_1$ of the projection image of the target object (the instrument I in the first embodiment) on the table 3 at the first point $P_1$ (that is the imaging position) and the size $L_2$ of the projection image of the target object (the instrument I) on the table 3 at the second point $P_2$ (different from the first point $P_1$). (b) is the distance s between the rotation center axes Ax of the table 3 at the first point $P_1$ and the second point $P_2$. The distance SRD can be obtained based on the parameters of (a), (b).

In the present invention (including the first embodiment and the like), based on the premise that the following parameter (c) is known or basically known, the distance SDD can be obtained without using a parameter corresponding to a known design dimension of an instrument as used in the conventional method. (c) is the distance between the X-ray detector 4 and the rotation center axis Ax of the table 3 at the first point $P_1$ (that is the imaging position).

Therefore, when the distance SRD is accurately obtained based on the parameters (a), (b), a focal position of the radiation source (the X-ray tube 2 in the first embodiment) is also accurately obtained, allowing the distance SDD to be accurately obtained only by adding up the distance SRD accurately obtained and the parameter of (c). Taking the ratio SDD/SRD between the distances SRD, SDD thus obtained as the imaging magnification at the first point $P_1$ allows the imaging magnification to be accurately calibrated. That is, even when the target object is the instrument I having an unknown dimension as in the first embodiment, it is possible to accurately obtain the distances SRD, SDD and the imaging magnification using the instrument I. As a result, even when any instrument I is used, the imaging magnification can be accurately calibrated.

Even when the focal position of the radiation source (the X-ray tube 2) varies with time, the parameter (distance) of (c) does not vary with time and can be regarded as being constant. The difference ($D^*(t) - d_1^*(t)$) between the distance SDD ($D^*(t)$) at the calibration time t and the distance SRD ($d_1^*(t)$) at the calibration time t can be regarded as the distance of (c) (that is, the distance between the X-ray detector 4 and the rotation center axis Ax of the table 3 at the first point $P_1$). Therefore, even at any calibration time t, the difference ($D^*(t) - d_1^*(t)$) can be regarded as being constant irrespective of variations in the focal point of the radiation source (the X-ray tube 2), and the difference ($D^*(t) - d_1^*(t)$) can be regarded as being equal to the difference ($D_0 - d_1$) between the SDD ($D_0$) calibrated at a time before the calibration time t and the SRD ($d_1$) calibrated at the time ($D^*(t) - d_1^*(t) = D_0 - d_1$ of the above equation (5)). As a result, the distances SRD, SDD can be each obtained by solving the equation (the above equation (5)) in which the difference ($D^*(t) - d_1^*(t)$) between the distance SDD ($D^*(t)$) at the calibration time t and the distance SRD ($d_1^*(t)$) at the calibration time t is equal to the difference ($D_0 - d_1$) between the SDD ($D_0$) calibrated at a time before the calibration time t and the SRD ($d_1$) calibrated at the time. As described above, the distances SRD, SDD and the imaging magnification can be accurately obtained by solving the equation (the above equation (5)) in which the parameter (distance) of (c) is unknown, but is constant without varying with time.

In the first embodiment, the projection image (the projection image of the instrument I in the first embodiment) used for obtaining the imaging magnification is an image obtained before and after the tomographic imaging of the subject M. Obtaining the projection image or the CT image as in the second, fourth, and fifth embodiments (to be described later) before and after the tomographic imaging of the subject M corresponds to obtaining the projection image or the CT image in a state where the properties of the radiation source have not changed from when the tomographic imaging of the subject M is performed.

In the first embodiment, the projection image is a projection image of the instrument I captured by the X-ray detector 4 with the instrument I placed on the table 3 to make the relative position of the instrument I with respect to the rotation center axis Ax known. The distance SRD is obtained by the geometric operation (the above equations (1), (2), or the above expression (4) that results from bringing together the equations (1), (2)) using the size $L_1$ of the projection image of the instrument I on the table 3 at the first point $P_1$ and the size $L_2$ of the projection image of the instrument I on the table 3 at the second point $P_2$ that correspond to the parameters of (a), and the distance s that corresponds to the parameter of (b). The distance SDD is obtained by adding up the distance SRD thus obtained and the distance corresponding to the parameter of (c) (that is, the distance between the X-ray detector 4 and the rotation center axis Ax of the table 3 at the first point $P_1$).

In the first embodiment, the sizes $L_1$, $L_2$ that correspond to the parameters of (a) of the projection images of the instrument I on the table 3 at the first point $P_1$ and the second point $P_2$ are actual measurement values captured by the X-ray detector 4, and the distance s that corresponds to the parameter of (b) between the rotation center axes Ax of the table 3 at the first point $P_1$ and the second point $P_2$ is known. Therefore, the distance SRD can be accurately obtained by the geometric operation (the above equations (1), (2), or the above equation (4) that results from bringing together the equations (1), (2)) using the parameters of (a) and (b). The distance SDD can also be accurately obtained only by adding up the distance SRD thus obtained and the parameter of (c).

Second Embodiment

Next, a second embodiment of the present invention will be described with reference to the drawings.

FIG. 1 is a schematic side view of the X-ray computed tomography scanner according to each embodiment. Components identical to the components in the first embodiment described above are denoted by the same reference numerals, and descriptions and illustrations of the components are omitted. Note that, in the second embodiment in addition to the third to fifth embodiments (to be described later), the X-ray computed tomography scanner 1 shown in FIG. 1 that is the same as in the first embodiment is used.

In the first embodiment, the instrument I (see FIG. 2) is placed on the table 3 to make the relative position of the instrument I with respect to the rotation center axis Ax known, and the imaging of the instrument I is performed by the X-ray detector 4 at each of the two points (the first point $P_1$ and the second point $P_2$) where the table 3 is positioned to obtain the projection images of the instrument I. On the other hand, in the second embodiment, the relative position with respect to the rotation center axis Ax is unknown. Therefore, the instrument I (see FIG. 3) is placed on the table 3 at the first point $P_1$, and the tomographic imaging of the instrument I is performed by the X-ray detector 4 to obtain the CT image of the instrument I. The CT image of the instrument I obtained through the tomographic imaging is sent to the imaging magnification calibrator 7 for use in the calibration of the imaging magnification. Furthermore, the projection images of the instrument I captured by the X-ray detector 4 at each of the two points (the first point $P_1$ and the second point $P_2$) where the table 3 is positioned are also sent to the imaging magnification calibrator 7 for use in the calibration of the imaging magnification.

Figure 3A:
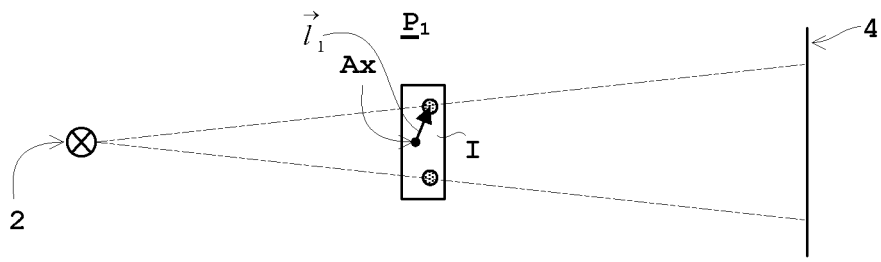
FIGS. 3a to 3c are schematic plan views of a focal point of an X-ray tube, a rotation center axis, a calibration instrument (instrument), and a detection surface of an X-ray detector that are provided for use in calibration of an imaging magnification according to a second embodiment.

Next, a specific operation of the imaging magnification calibrator 7 (see FIG. 1) according to the second embodiment will be described with reference to FIG. 3. FIGS. 3a to 3c are schematic plan views of the focal point of the X-ray tube, the rotation center axis, the calibration instrument (instrument), and the detection surface of the X-ray detector that are provided for use in the calibration of the imaging magnification according to the second embodiment. As in FIG. 2, the illustration of the table is omitted, and only the focal point of the X-ray tube and the detection surface of the X-ray detector are illustrated in FIGS. 3a to 3c.

In the second embodiment, before and after the tomographic imaging of the subject M (see FIG. 1) or concurrently with the tomographic imaging of the subject M, the instrument I is placed on the table 3 (see FIG. 1) at the first point $P_1$, and the tomographic imaging of the instrument I is performed by the X-ray detector 4 to obtain the CT image of the instrument I. Then, the relative position of the instrument I with respect to the rotation center axis Ax is obtained from pixel coordinates of the instrument I reflected in the CT image. Before and after the above, the instrument I is placed on the table 3 without changing the properties of the radiation source, and the imaging of the instrument I is performed by the X-ray detector 4 at each of the two points (the first point $P_1$ and the second point $P_2$) where the table 3 is positioned.

As described in the first embodiment, before and after the tomographic imaging of the instrument I, the linear drive mechanism 5 moves the table 3 on which the instrument I is placed (see FIG. 1), and the imaging is performed at the two points (the first point $P_1$ and the second point $P_2$) indicated by the solid line in FIG. 1 and the long dashed double-short dashed line in FIG. 1. As in the first embodiment, the order of the imaging at the first point $P_1$ and the second point $P_2$ is not particularly limited. The imaging of the instrument I may be performed at the second point $P_2$ after the imaging of the instrument I is performed at the first point $P_1$ that is the imaging position, or alternatively the imaging of the instrument I may be performed at the first point $P_1$ that is the imaging position after the imaging of the instrument I is performed at the second point $P_2$. Through the imaging of the instrument I, the projection image of the instrument I is obtained.

Here, examples of the condition where the properties of the radiation source are not changed include the condition where the tube voltage and the tube current of the X-ray tube 2 are constant as in the first embodiment. Therefore, while the tube voltage and the tube current at the time of the tomographic imaging are constant through before and after the tomographic imaging of the subject M or the tomographic imaging of the instrument I, the imaging of the instrument I is performed. As in the first embodiment, the condition where the properties of the radiation source are not changed is not limited to the condition where the tube voltage and tube current are constant. The condition for the properties of the radiation source may be set in accordance with the specification or type of the X-ray tube. Conditions where the properties of the radiation source are not changed other than the condition where the tube voltage and the tube current are constant have already been described in the first embodiment; therefore, no description of such conditions is given here.

Here, the instrument I whose design dimension is unknown is used, but as described in the first embodiment, the design dimension of the instrument I may be known.

A specific method for obtaining the relative position of the instrument I with respect to the rotation center axis Ax from pixel coordinates of the instrument I reflected in the CT image will be described. First, as shown in FIG. 3a, a relative position vector of the instrument I with respect to the rotation center axis Ax in the actual CT image is denoted by $l_1$ (represented as a vector together with an arrow over $l_1$ in FIG. 3 or the following expressions). With coordinates ($x_1$, $y_1$) of a marker with the coordinates of the rotation center axis Ax taken as an origin, the relative position vector $l_1$ of the instrument I with respect to the rotation center axis Ax in the actual CT image is represented by ($x_1$, $y_1$).

Figure 3B:
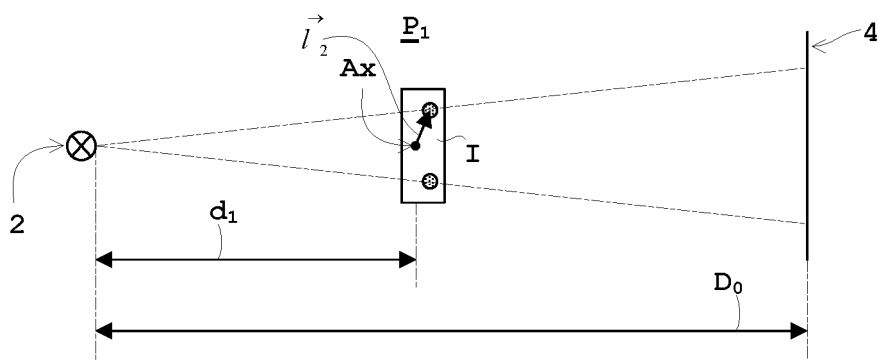

As in the first embodiment, as shown in FIG. 3b, a distance SRD between the focal point of the X-ray tube 2 and the rotation center axis Ax of the table 3 (see FIG. 1) at the first point $P_1$ calibrated at a past reference time is denoted by $d_1$, and a distance SDD between the focal point of the X-ray tube 2 and the X-ray detector 4 calibrated at the reference time is denoted by $D_0$. As in the first embodiment, the properties of the radiation source changes every time the tomographic imaging is performed, and thus it is preferable that the calibration according to the present invention (including the second embodiment and the like) be performed every time the tomographic imaging is performed, and the SRD calibrated immediately before the target calibration be $d_1$ and the SDD calibrated immediately before the target calibration be $D_0$. The $d_1$ and $D_0$ thus set are temporary values.

Therefore, since the CT image obtained based on the temporarily set SRD (=$d_1$) and SDD (=$D_0$) does not use the SRD, SDD to be calibrated, the relative position vector of the instrument I with respect to the rotation center axis Ax in the CT image obtained based on the temporarily set SRD (=$d_1$) and SDD (=$D_0$) is enlarged or reduced relative to the relative position vector $l_1$ of the instrument I with respect to the rotation center axis Ax in the actual CT image. In other words, the CT image obtained based on the temporarily set SRD (=$d_1$) and SDD (=$D_0$) without using the SRD, SDD to be calibrated is enlarged or reduced relative to the actual CT image obtained using the SRD, SDD to be calibrated.

Therefore, the use of the CT image captured through the tomographic imaging (that is, the CT image obtained based on the temporarily set SRD (=$d_1$) and SDD (=$D_0$)) and enlarged or reduced relative to the actual CT image enlarges or reduces the sizes $L_1$, $L_2$ (see FIG. 3c) of the projection images to be captured of the instrument I relative to the actual sizes. However, even when the sizes $L_1$, $L_2$ of the projection images are enlarged or reduced relative to the actual sizes, the SRD, SDD to be calibrated can be accurately obtained by a geometric operation (to be described later).

As shown in FIG. 3b, a relative position vector of the instrument I with respect to the rotation center axis Ax in the CT image obtained based on the temporarily set SRD (=$d_1$) and SDD (=$D_0$) is denoted by $l_2$ (represented as a vector together with an arrow over $l_2$ in FIG. 3 or the following expressions). As with the relative position vector $l_1$, with coordinates ($x_2$, $y_2$) of a marker with the coordinates of the rotation center axis Ax taken as an origin, the relative position vector $l_2$ of the instrument I with respect to the rotation center axis Ax in the CT image based on the temporarily set SRD (=$d_1$) and SDD (=$D_0$) is represented by ($x_2$, $y_2$).

In other words, the relative position vector $l_2$=($x_2$, $y_2$) is obtained through actual measurement of the coordinates ($x_2$, $y_2$) of the instrument I reflected in the CT image captured through the tomographic imaging. In summary, the relative position vector $l_2$ is obtained from the pixel coordinates of the instrument I reflected in the CT image captured through the tomographic imaging performed by the X-ray detector 4 with the instrument I placed on the table 3 at the first point $P_1$.

Since it is the relative position vector $l_2$=($x_2$, $y_2$) of the instrument I reflected in the CT image captured through the tomographic imaging (that is, the CT image obtained based on the temporarily set SRD (=$d_1$) and SDD (=$D_0$)), a parameter that results from converting the relative position vector $l_2$ into the coordinates ($x_2$, $y_2$) is used in the geometric operation. Further, as shown in FIG. 3c, the distance between the rotation center axes Ax of the table 3 (see FIG. 1) at the first point $P_1$ and the second point $P_2$ is denoted by s (see also FIG. 1), and the sizes of projection images of the instrument I on the table 3 at the first point $P_1$ and the second point $P_2$ are denoted by $L_1$ and $L_2$, respectively. In FIG. 3c, with one of the two markers that highly contrast with air in the projection images represented by ($x_1$, $y_1$) and the other represented by ($x_1$, $-y_1$), projection dimensions (inter-pixel distances) between the two markers on the projection images are denoted by $L_1$, $L_2$.

Figure 3C:
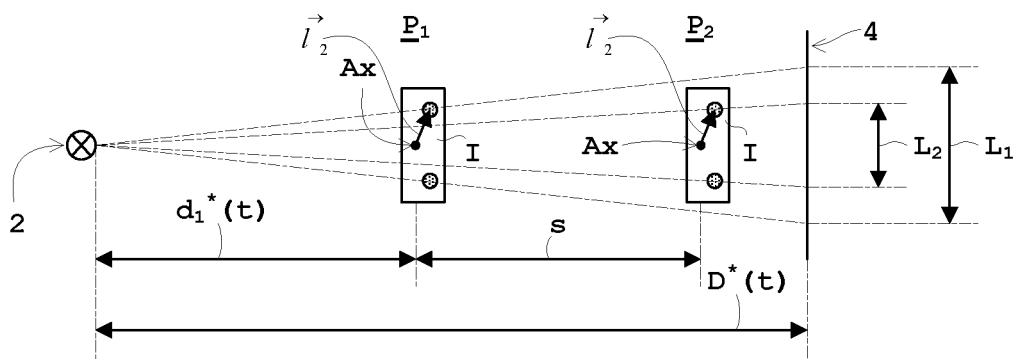

Further, as in the first embodiment, as shown in FIG. 3c, the SRD to be calibrated is denoted by $d_1^*(t)$, and the SDD to be calibrated is denoted by $D^*(t)$. As described in the first embodiment, t denotes the calibration time, and unknown $d_1^*(t)$ and $D^*(t)$ can be each regarded as a function of time t. A geometric operation using the distance s between the rotation center axes Ax of the table 3 at the first point $P_1$ and the second point $P_2$, the sizes $L_1$, $L_2$ of the projection images of the instrument I on the table 3 at the first point $P_1$ and the second point $P_2$, and the coordinates ($x_2$, $y_2$) that results from converting the relative position vector $l_2$ is represented by the following equations (6), (7).

$$D^*(t)/(d_1^*(t)+x_2) \times y_2 = L_1/2 \qquad (6)$$

$$D^*(t)/(d_1^*(t)+s+x_2) \times y_2 = L_2/2 \qquad (7)$$

Bringing together the above equations (6), (7) using $2 \times D^*(t) \times y_2$ results in the following equation (8).

$$(2 \times D^*(t) \times y_2 =) L_1 \times (d_1^*(t)+x_2) = L_2 \times (d_1^*(t)+s+x_2) \qquad (8)$$

As is apparent from the above equation (8), the SRD ($d_1^*(t)$) to be calibrated can be obtained using the coordinate $x_2$ of the relative position in the emitting axis direction, without using the coordinate $y_2$ of the relative position in a direction orthogonal to the emitting axis. This is apparent from the fact that, in the first embodiment, the design dimension l of the instrument I is the length in the direction orthogonal to the emitting axis, whereas, in the second embodiment, the design dimension l of the instrument I is replaced with the coordinate $y_2$ of the relative position in the direction orthogonal to the emitting axis.

Unlike the first embodiment, the coordinate $x_2$ of the relative position in the emitting axis direction is included in the above equation (8). Therefore, in the second embodiment, the SRD ($d_1^*(t)$) to be calibrated can be obtained by including a parameter of the coordinate $x_2$ of the relative position in the geometric operation of the above equation (8). The SDD ($D^*(t)$) to be calibrated is obtained by solving the above equation (5) in the first embodiment (by adding up the SRD ($d_1^*(t)$) already obtained and the parameter ($D_0 - d_1$)). Furthermore, the ratio SDD/SRD between the distances SRD, SDD is taken as the imaging magnification at the first point $P_1$.

Finally, in order to eliminate the influence of enlargement or reduction, the relative position vector $l_2$ of the instrument I with respect to the rotation center axis Ax in the CT image obtained based on the temporarily set SRD (=$d_1$) and SDD (=$D_0$) is calibrated to the relative position vector $l_1$ of the instrument I relative to the rotation center axis Ax in the actual CT image.

Using the temporarily set SRD ($d_1$), SDD ($D_0$) and the SRD ($d_1^*(t)$), SDD ($D^*(t)$) to be calibrated, the relative position vectors $l_1$, $l_2$ are represented by the following relational expression (9).

[Expression 1]

$$\frac{D^*(t)}{d_1^*(t)}\vec{l_1} = \frac{D_0}{d_1}\vec{l_2} \quad (9)$$

The above expression (9) is transformed into the following expression (10).

[Expression 2]

$$\vec{l_1} = \frac{D_0}{d_1} \times \frac{d_1^*(t)}{D^*(t)}\vec{l_2} \quad (10)$$

The relative position vector $l_2$ is multiplied by $D_0/d_1 \times d_1^*(t)/D^*(t)$ on the right side of the above expression (10) to eliminate the influence of enlargement or reduction and calibrated into the relative position vector $l_1$.

By the method for calibrating an imaging magnification according to the second embodiment, as in the first embodiment, the distance SRD can be obtained based on (a) the size $L_1$ of the projection image of the target object (the instrument I in the second embodiment) on the table 3 at the first point $P_1$ (that is the imaging position) and the size $L_2$ of the projection image of the target object (the instrument I) on the table 3 at the second point $P_2$ (that is different from the first point $P_1$), and (b) the distance s between the rotation center axes Ax of the table 3 at the first point $P_1$ and the second point $P_2$. Furthermore, the distance SDD can be obtained by adding up the distance SRD thus obtained and (c) the distance between the X-ray detector 4 and the rotation center axis Ax of the table 3 at the first point $P_1$ (that is the imaging position), and the imaging magnification can be calibrated by taking the ratio between the distances SRD, SDD thus obtained as the imaging magnification at the first point $P_1$. As a result, even when any instrument I is used, the imaging magnification can be accurately calibrated.

In the second embodiment, the projection image (the projection image of the instrument I in the second embodiment) and the CT image (the CT image of the instrument I in the second embodiment) used for obtaining the imaging magnification are images obtained before and after the tomographic imaging of the subject M. Further, in the second embodiment, the CT image of the instrument I obtained concurrently with the tomographic imaging of the subject M may be used for obtaining the imaging magnification. As described in the first embodiment, obtaining the projection image or the CT image before and after the tomographic imaging of the subject M corresponds to obtaining the projection image or the CT image in a state where the properties of the radiation source have not changed from when the tomographic imaging of the subject M is performed.

When the CT image of the instrument I is obtained concurrently with the tomographic imaging of the subject M, the CT image of the subject M through the tomographic imaging of the subject M and the CT image of the instrument I used for obtaining the imaging magnification can be obtained concurrently in a state where the properties of the radiation source have not surely changed. In order to obtain the CT image of the instrument I concurrently with the tomographic imaging of the subject M, the table 3 is positioned at the first point $P_1$ that is the imaging position, and the tomographic imaging is performed with the subject M and the instrument I concurrently placed on the same table 3.

In the second embodiment, the relative position of the instrument I with respect to the rotation center axis Ax is obtained from the pixel coordinates of the instrument I reflected in the CT image captured through the tomographic imaging performed by the X-ray detector 4 with the instrument I placed on the table 3 at the first point $P_1$. On the other hand, the projection image is a projection image of the instrument I captured by the X-ray detector 4, and the distance SRD is obtained by the geometric operation (the above equations (6), (7), or the above equation (8) that results from bringing together the equations (6), (7)) using the size $L_1$ of the projection image of the instrument I on the table 3 at the first point $P_1$ and the size $L_2$ of the projection image of the instrument I on the table 3 at the second point $P_2$ that correspond to the parameters of (a), the distance s corresponding to the parameter of (b), and (d) the relative position of the instrument I with respect to the rotation center axis Ax. The distance SDD is obtained by adding up the distance SRD thus obtained and the distance corresponding to the parameter of (c) (that is, the distance between the X-ray detector 4 and the rotation center axis Ax of the table 3 at the first point $P_1$).

In the first embodiment, the relative position of the instrument I with respect to the rotation center axis Ax is known, but in the second embodiment, the relative position of the instrument I with respect to the rotation center axis Ax is unknown. Therefore, the CT image of the instrument I is obtained through the tomographic imaging performed by the X-ray detector 4 with the instrument I placed on the table at the first point $P_1$. The relative position of the instrument I with respect to the rotation center axis Ax is obtained from the pixel coordinates of the instrument I reflected in the CT image. With the relative position of the instrument I with respect to the rotation center axis Ax taken as the parameter of (d), the distance SRD can be accurately obtained by the geometric operation (the above equations (6), (7), or the above equation (8) that results from bringing together the equations (6), (7)) using the parameter of (d) in the second embodiment in addition to the parameters of (a) and (b) in first embodiment. The distance SDD can also be accurately obtained only by adding up the distance SRD thus obtained and the parameter of (c).

Third Embodiment

Next, a third embodiment of the present invention will be described with reference to the drawings.

FIG. 1 is a schematic side view of the X-ray computed tomography scanner according to each embodiment. Components identical to the components in the first and second embodiments are denoted by the same reference numerals, and descriptions and illustrations of the components are omitted. Note that, in the third embodiment in addition to the fourth and fifth embodiments (to be described later), the X-ray computed tomography scanner 1 shown in FIG. 1 that is the same as in the first and second embodiments is used.

In the first and second embodiments, an image (the projection image of the instrument I or the CT image of the instrument I) obtained through the imaging or the tomographic imaging performed on the instrument I serving as the target object (see FIG. 2 or 3) is provided for use in the calibration of the imaging magnification. On the other hand, in the third embodiment, an image (the projection image of the subject M or the CT image of the subject M) obtained through the imaging or the tomographic imaging performed on the subject M serving as the target object that is subject to the tomographic imaging is provided for use in the calibration of the imaging magnification. Specifically, the CT image of the subject M is obtained through the tomographic imaging performed by the X-ray detector 4 with the subject M placed on the table 3 at the first point $P_1$. The CT image of the subject M obtained through the tomographic imaging is sent to the imaging magnification calibrator 7 for use in the calibration of the imaging magnification. Furthermore, an actually measured projection image and a simulation projection image (to be described later) are also sent to the imaging magnification calibrator 7 for use in the calibration of the imaging magnification.

Next, a specific operation of the imaging magnification calibrator 7 (see FIG. 1) according to the third embodiment will be described with reference to FIG. 4. FIGS. 4a to 4c are schematic plan views of the focal point of the X-ray tube, the rotation center axis, the subject, and the detection surface of the X-ray detector that are provided for use in the calibration of the imaging magnification according to the third embodiment. As in FIG. 2 or 3, the illustration of the table is omitted, and only the focal point of the X-ray tube and the detection surface of the X-ray detector are illustrated in FIG. 4.

Figure 4A:
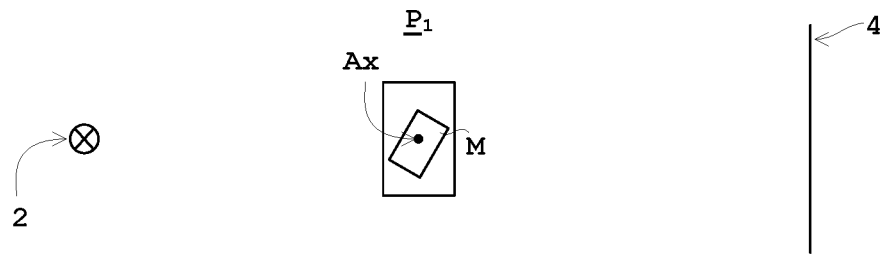
FIGS. 4a to 4c are schematic plan views of a focal point of an X-ray tube, a rotation center axis, a subject, and a detection surface of an X-ray detector that are provided for use in calibration of an imaging magnification according to a third embodiment.
Figure 4B:
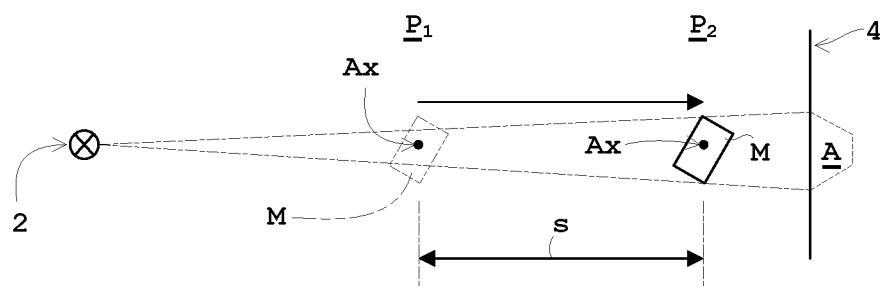

In the third embodiment, as shown in FIG. 4a, from the CT image captured through the tomographic imaging performed by the X-ray detector 4 with the subject M placed on the table 3 (see FIG. 1) at the first point $P_1$, a structure of the subject indicating the size of the CT image of the subject M at the first point $P_1$ is obtained. Thereafter, when the table 3 is positioned at the second point $P_2$ that is distanced from the first point $P_1$ by the distance s (see FIG. 4b) without changing the properties of the radiation source, the actually measured projection image that is projected from the structure of the subject M and captured by the X-ray detector 4 is obtained.

After the tomographic imaging of the subject M, the linear drive mechanism 5 moves the table 3 on which the subject M is placed (see FIG. 1), and the imaging is performed at the two points (the second point $P_2$) indicated by the long dashed double-short dashed line in FIG. 1. The actually measured projection image of the subject M is obtained through the imaging of the structure of the subject M in which the structure of the subject M is projected and captured by the X-ray detector 4. As shown in FIG. 4b, the actually measured projection image is denoted by A.

Figure 4C:
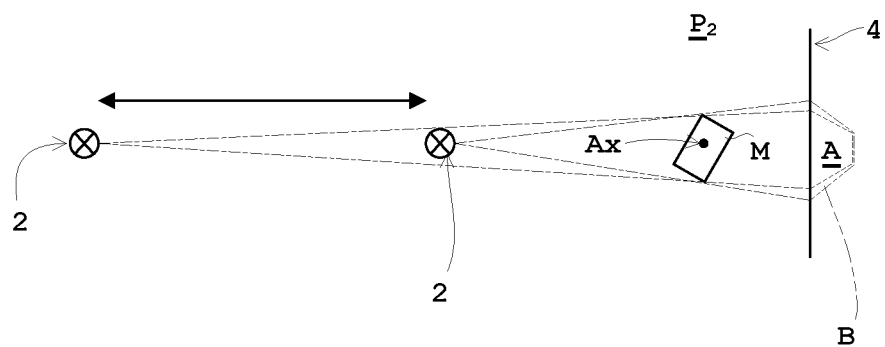

As shown in FIG. 4c, when the table 3 is positioned at the second point $P_2$, the simulation projection image that is projected from the structure of the subject M while moving the focal point of the X-ray tube 2 in a pseudo manner is obtained. The simulation projection image is denoted by B. Here, the simulation projection image corresponds to a projection image that is formed by lines connecting the focal point of the X-ray tube 2 and the structure (contour) of the subject M without actually emitting the X-rays from the X-ray tube 2 and projected along extension lines of the formation lines and onto the detection surface of the X-ray detector.

In order to make the actually measured projection image A and the simulation projection image B identical in size to each other, matching between the actually measured projection image A and the simulation projection image B is performed while moving the focal point of the X-ray tube 2 in a pseudo manner. A distance between the focal point of the X-ray tube 2 and the rotation center axis Ax of the table 3 at the first point $P_1$ when the matching between the simulation projection image B and the actually measured projection image A is accomplished can be obtained as the distance SRD. A distance between the focal point of the X-ray tube 2 and the X-ray detector 4 when the matching between the simulation projection image B and the actually measured projection image A is accomplished is obtained as the distance SDD. Furthermore, the ratio SDD/SRD between the distances SRD, SDD is taken as the imaging magnification at the first point $P_1$.

By the method for calibrating an imaging magnification according to the third embodiment, as in the first and second embodiments, the distance SRD can be obtained based on (a) the size of the CT image (the structure of the subject M indicating the size of the CT image of the subject M in the third embodiment) of the target object (the subject M in the third embodiment) on the table 3 at the first point $P_1$ (that is the imaging position) and the size of the projection image (the actually measured projection image A and the simulation projection image B projected from the structure of the subject M in the third embodiment) on the table 3 at the second point $P_2$ (that is different from the first point $P_1$), and (b) the distance s between the rotation center axes Ax of the table 3 at the first point $P_1$ and the second point $P_2$. Furthermore, the distance SDD can be obtained by adding up the distance SRD thus obtained and (c) the distance between the X-ray detector 4 and the rotation center axis Ax of the table 3 at the first point $P_1$ (that is the imaging position), and the imaging magnification can be calibrated by taking the ratio between the distances SRD, SDD thus obtained as the imaging magnification at the first point $P_1$. As a result, even when the subject M that is subject to the tomographic imaging is used, the imaging magnification can be accurately calibrated.

As described above, in the third embodiment, the image (the projection image of the subject M or the CT image of the subject M) obtained through the imaging or the tomographic imaging performed on the subject M serving as the target object that is subject to the tomographic imaging is provided for use in the calibration of the imaging magnification. Therefore, from the CT image captured through the tomographic imaging performed by the X-ray detector 4 with the subject M placed on the table 3 at the first point $P_1$, the structure of the subject M indicating the size corresponding to the parameter of (a) of the CT image of the subject M at the first point $P_1$ is obtained. When the table 3 is positioned at the second point $P_2$ that is distanced from the first point $P_1$ by the distance s corresponding to the parameter of (b), the actually measured projection image that is projected from the structure of the subject M and captured by the X-ray detector 4 is obtained.

At this time, since the CT image of the subject M does not use the SRD, SDD to be calibrated, the structure of the subject M indicating the size of the CT image of the subject M is also enlarged or reduced relative to the actual CT image of the subject M. Furthermore, since the subject M that is subject to the tomographic imaging is any subject M whose dimensions are unknown, it is not easy to obtain actual dimensions of the subject M only from the actually measured projection image A that is projected from the structure of the subject M and captured by the X-ray detector 4. Therefore, when the table 3 is positioned at the second point $P_2$ that is distanced from the first point $P_1$ by the distance s corresponding to the parameter of (b), the simulation projection image B that is projected from the structure of the subject M while moving the focal point of the radiation source (the X-ray tube 2 in the third embodiment) in a pseudo manner is used. In order to make the actually measured projection image A and the simulation projection image B identical in size to each other, matching between the size of the actually measured projection image A and the size of the simulation projection image B is performed while moving the focal point of the radiation source (the X-ray tube 2) in a pseudo manner.

Note that when the matching between the actually measured projection image A and the simulation projection image B is performed with the position of the table 3 fixed at the first point $P_1$ (that is, at the same point as where the tomographic imaging is performed), a degree of freedom of magnification prevents not only the SRD but also the SDD from being calibrated. In order to eliminate this degree of freedom, it is necessary to make the distance between different points (the distance between the rotation center axes Ax of the table 3 at the first point $P_1$ and the second point $P_2$), that is, the distance s (>0) corresponding to the parameter of (b) known. The distance between the focal point of the radiation source (the X-ray tube 2) and the rotation center axis Ax of the table 3 at the first point $P_1$ when the matching between the simulation projection image B and the actually measured projection image A is accomplished can be accurately obtained as the distance SRD. The distance between the focal point of the radiation source (the X-ray tube 2) and the X-ray detector 4 when the matching between the simulation projection image B and the actually measured projection image A is accomplished can be accurately obtained as the distance SDD only by adding up the distance SRD thus obtained and the distance corresponding to the parameter of (c) (that is, the distance between the X-ray detector 4 and the rotation center axis Ax of the table 3 at the first point $P_1$).

Fourth Embodiment

Next, a fourth embodiment of the present invention will be described with reference to the drawings.

FIG. 1 is a schematic side view of the X-ray computed tomography scanner according to each embodiment. Components identical to the components in the first to third embodiments are denoted by the same reference numerals, and descriptions and illustrations of the components are omitted. Note that, in the fourth embodiment in addition to the fifth embodiment (to be described later), the X-ray computed tomography scanner 1 shown in FIG. 1 that is the same as in the first to third embodiments is used.

In the first to third embodiments, at least the projection image is provided for use in the calibration of the imaging magnification. On the other hand, in the fourth embodiment, only the CT image of the instrument I (see FIG. 5) is provided for use in the calibration of the imaging magnification. Specifically, the CT image of the instrument I at the first point $P_1$ is obtained through the tomographic imaging performed by the X-ray detector 4 with the instrument I placed on the table 3 at the first point $P_1$, and the CT image of the instrument I at the second point $P_2$ is obtained through the tomographic imaging performed by the X-ray detector 4 with the instrument I placed on the table 3 at the second point $P_2$. The CT image of the instrument I obtained through the tomographic imaging is sent to the imaging magnification calibrator 7 for use in the calibration of the imaging magnification.

Figure 5A:
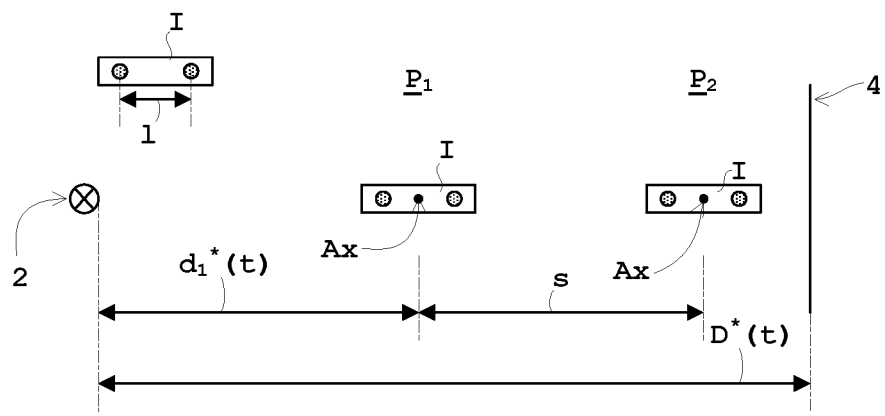
FIGS. 5a and 5b are schematic plan views of a focal point of an X-ray tube, a rotation center axis, a calibration instrument (instrument), and a detection surface of an X-ray detector that are provided for use in calibration of an imaging magnification according to a fourth embodiment.
Figure 5B:
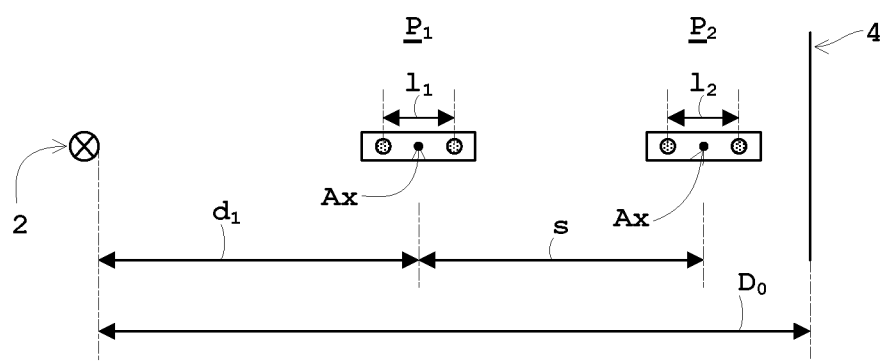

Next, a specific operation of the imaging magnification calibrator 7 (see FIG. 1) according to the forth embodiment will be described with reference to FIG. 5. FIGS. 5a and 5b are schematic plan views of the focal point of the X-ray tube, the rotation center axis, the calibration instrument (instrument), and the detection surface of the X-ray detector that are provided for use in the calibration of the imaging magnification according to the fourth embodiment. As in FIG. 2, 3, or 4, the illustration of the table is omitted, and only the focal point of the X-ray tube and the detection surface of the X-ray detector are illustrated in FIG. 5.

In the fourth embodiment, before and after the tomographic imaging of the subject M (see FIG. 1), the instrument I is placed on the table 3 (see FIG. 1) without changing properties of the radiation source, and the tomographic imaging is performed by the X-ray detector 4 on the instrument I at each of the two points (the first point $P_1$ and the second point $P_2$) where the table 3 is positioned.

As described in the first and second embodiments, before and after the tomographic imaging of the subject M, the linear drive mechanism 5 moves the table 3 on which the instrument I is placed, and the tomographic imaging is performed at the two points (the first point $P_1$ and the second point $P_2$) indicated by the solid line in FIG. 1 and the long dashed double-short dashed line in FIG. 1. As in the first and second embodiments, the order of the imaging at the first point $P_1$ and the second point $P_2$ is not particularly limited. The tomographic imaging of the instrument I may be performed at the second point $P_2$ after the tomographic imaging of the instrument I is performed at the first point $P_1$ that is the imaging position, or alternatively the tomographic imaging of the instrument I may be performed at the first point $P_1$ that is the imaging position after the tomographic imaging of the instrument I is performed at the second point $P_2$. Through the tomographic imaging of the instrument I, the CT image of the instrument I is obtained.

Here, examples of the condition where the properties of the radiation source are not changed include the condition where the tube voltage and the tube current of the X-ray tube 2 are constant as in the first and second embodiments. Therefore, while the tube voltage and the tube current at the time of the tomographic imaging are constant through before and after the tomographic imaging of the subject M, the tomographic imaging of the instrument I is performed. As in the first and second embodiments, the condition where the properties of the radiation source are not changed is not limited to the condition where the tube voltage and tube current are constant. The condition for the properties of the radiation source may be set in accordance with the specification or type of the X-ray tube. Conditions where the properties of the radiation source are not changed other than the condition where the tube voltage and the tube current are constant have already been described in the first embodiment; therefore, no description of such conditions is given here.

Here, the instrument I whose design dimension is unknown is used, but as described in the first embodiment, the design dimension of the instrument I may be known.

As shown in FIG. 5a, in actual geometry, as described in each of the embodiments, the SRD to be calibrated is denoted by $d_1^*(t)$, and the SDD to be calibrated is denoted by $D^*(t)$. As described in the first and second embodiments, t denotes the calibration time, and unknown $d_1^*(t)$ and $D^*(t)$ can be each regarded as a function of time t. For the sake of convenience, the design dimension (the distance between the markers in FIG. 5) of the instrument I is denoted by l, as in the first embodiment.

Further, as shown in FIG. 5b, sizes (sizes of the instrument) of the CT images of the instrument I on the table 3 at the first point $P_1$ and the second place $P_2$ are denoted by $l_1$, $l_2$, the sizes being obtained based on the temporarily set SRD ($=d_1$) and SDD ($=D_0$). A geometric operation using the distance s between the rotation center axes Ax of the table 3 at the first point $P_1$ and the second point $P_2$, the sizes $l_1$, $l_2$ of the CT images of the instrument I on the table 3 at the first point $P_1$ and the second point $P_2$ is represented by the following equations (11) and (12).

$$D^*(t)/d_1^*(t) \times l = D_0/d_1 \times l_1 \qquad (11)$$

$$D^*(t)/(d_1^*(t)+s) \times l = D_0/(d_1+s) \times l_2 \qquad (12)$$

Bringing together the above equations (11), (12) using $D^*(t)/D_0 \times l$ results in the following equation (13).

$$(D^*(t)/D_0 \times l=) d_1^*(t)/d_1 \times l_1 = (d_1^*(t)+s)/(d_1+s) \times l_2 \qquad (13)$$

As is apparent from the above equation (13), the SRD ($d_1^*(t)$) to be calibrated can be obtained by the following equation (14) without using the design dimension l of the instrument I.

$$d_1^*(t) = s \times d_1 \times l_2 / (d_1 \times l_1 + s \times l_1 - d_1 \times l_2) \qquad (14)$$

The sizes $l_1$, $l_2$ of the CT images of the instrument I in the above equation (14) are actual measurement values, the distance s between the rotation center axes Ax of the table 3 at the first point $P_1$ and the second point $P_2$ is known, and the temporarily set SRD ($d_1$) is an SRD calibrated immediately before the target calibration and is known. Therefore, the SRD ($d_1^*(t)$) to be calibrated can be obtained by the above equation (14).

The SDD ($D^*(t)$) to be calibrated is obtained by solving the above equation (5) in the first embodiment (by adding up the SRD ($d_1^*(t)$) already obtained and the parameter ($D_0-d_1$)). Furthermore, the ratio SDD/SRD between the distances SRD, SDD is taken as the imaging magnification at the first point $P_1$.

By the method for calibrating an imaging magnification according to the fourth embodiment, as in the first to third embodiments, the distance SRD can be obtained based on (a) the size $l_1$ of the CT image of the target object (the instrument I in the fourth embodiment) on the table 3 at the first point $P_1$ (that is the imaging position) and the size $l_2$ of the CT image of the target object (the instrument I) on the table 3 at the second point $P_2$ (that is different from the first point $P_1$), and (b) the distance s between the rotation center axes Ax of the table 3 at the first point $P_1$ and the second point $P_2$. Furthermore, the distance SDD can be obtained by adding up the distance SRD thus obtained and (c) the distance between the X-ray detector 4 and the rotation center axis Ax of the table 3 at the first point $P_1$ (that is the imaging position), and the imaging magnification can be calibrated by taking the ratio between the distances SRD, SDD thus obtained as the imaging magnification at the first point $P_1$. As a result, even when any instrument I is used, the imaging magnification can be accurately calibrated.

As described above, in the fourth embodiment, only the CT image of the instrument I is provided for use in the calibration of the imaging magnification. As with the CT image of the subject M in the third embodiment, since the CT image of the instrument I does not use the SRD, SDD to be calibrated, the CT image of the instrument I is enlarged or reduced relative to the actual CT image of the instrument I. In other words, when the CT image is obtained based on accurately calibrated SRD, SDD, the CT image having actual dimensions can be obtained regardless of the position (imaging position) of table 3. However, SRD, SDD that have not been calibrated do not have correct values due to variations in the focal position of the radiation source (the X-ray tube 2 in the fourth embodiment). Therefore, when the SRD, SDD that have not been calibrated are used, the size of the CT image varies with the position (imaging position) of table 3.

The sizes $l_1$, $l_2$ corresponding to the parameters of (a) of the CT images of the instrument I on the table 3 at the first point $P_1$ and the second point $P_2$ are actual measurement values based on the tomographic imaging performed by the X-ray detector 4, and the distance corresponding to the parameter of (b) between the rotation center axes Ax of the table 3 at the first point $P_1$ and the second point $P_2$ is known. Therefore, the distance SRD can be accurately obtained by the geometric operation (the above equations (11), (12), or the above equation (14) that results from bringing together the equations (11), (12)) using the parameters of (a) and (b). The distance SDD can also be accurately obtained only by adding up the distance SRD thus obtained and the parameter of (c).

Fifth Embodiment

Next, a fifth embodiment of the present invention will be described with reference to the drawings.

FIG. 1 is a schematic side view of the X-ray computed tomography scanner according to each embodiment. Components identical to the components in the first to fourth embodiments are denoted by the same reference numerals, and descriptions and illustrations of the components are omitted. Note that, in the fifth embodiment, the X-ray computed tomography scanner 1 shown in FIG. 1 that is the same as in the first to fourth embodiments is used.

In the first and second embodiments, an image (the projection image of the instrument I or the CT image of the instrument I) obtained through the imaging or the tomographic imaging performed on the instrument I serving as the target object (see FIG. 2 or 3) is provided for use in the calibration of the imaging magnification. On the other hand, in the fifth embodiment, an image (the CT image of the subject M) obtained through the tomographic imaging performed on the subject M serving as the target object that is subject to the tomographic imaging is provided for use in the calibration of the imaging magnification as in the third embodiment. Specifically, the CT image of the subject M at the first point $P_1$ is obtained through the tomographic imaging performed by the X-ray detector 4 with the subject M placed on the table 3 at the first point $P_1$, and the CT image of the subject M at the second point $P_2$ is obtained through the tomographic imaging performed by the X-ray detector 4 with the subject M placed on the table 3 at the second point $P_2$. The CT image of the subject M obtained through the tomographic imaging is sent to the imaging magnification calibrator 7 for use in the calibration of the imaging magnification.

Figure 6A:
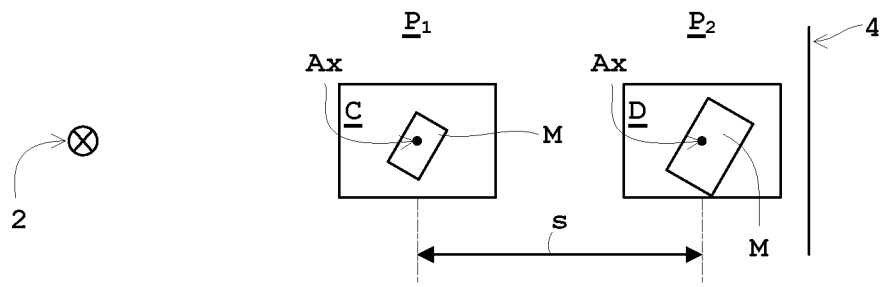
FIGS. 6a and 6b are schematic plan views of a focal point of an X-ray tube, a rotation center axis, a subject, and a detection surface of an X-ray detector that are provided for use in calibration of an imaging magnification according to a fifth embodiment.
Figure 6B:
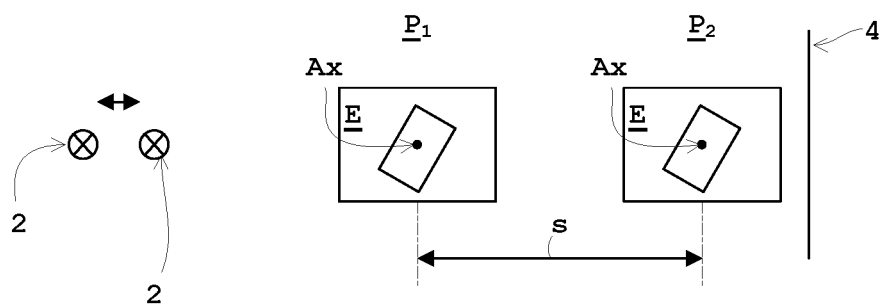
Figure 7:
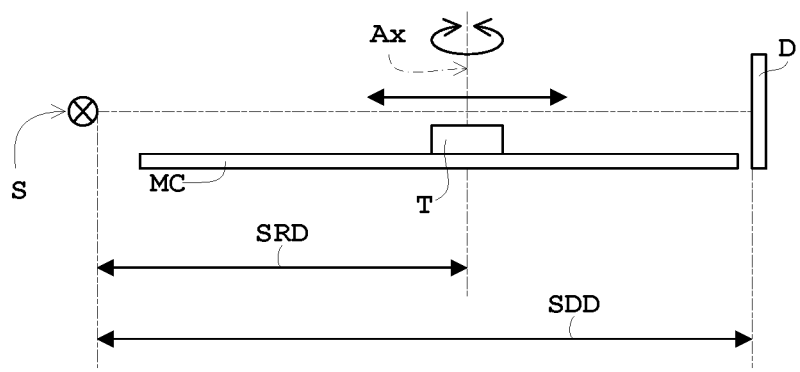
FIG. 7 is a schematic side view of a conventional radiation computed tomography scanner configured to calibrate an imaging magnification.

Next, a specific operation of the imaging magnification calibrator 7 (see FIG. 1) according to the fifth embodiment will be described with reference to FIG. 6. FIGS. 6a and 6b are schematic plan views of the focal point of the X-ray tube, the rotation center axis, the subject, and the detection surface of the X-ray detector that are provided for use in the calibration of the imaging magnification according to the fifth embodiment. As in FIG. 2, 3, 4, or 5, the illustration of the table is omitted, and only the focal point of the X-ray tube and the detection surface of the X-ray detector are illustrated in FIG. 6.

In the fifth embodiment, in addition to the tomographic imaging of the subject M, the instrument I is placed on the table 3 (see FIG. 1) at the second point $P_2$ different from the first point $P_1$ that is the imaging position without changing the properties of the radiation source, and the tomographic imaging of the subject M is performed by the X-ray detector 4 at the second point $P_2$.

The linear drive mechanism 5 moves the table 3 on which the subject M is placed (see FIG. 1), and the tomographic imaging is performed at the two points (the second point $P_2$) indicated by the long dashed double-short dashed line in FIG. 1. As in the first, second, and fourth embodiments, the order of the imaging at the first point $P_1$ and the second point $P_2$ is not particularly limited. The tomographic imaging of the subject M may be performed at the second point $P_2$ after the tomographic imaging of the subject M is performed at the first point $P_1$ that is the imaging position, or alternatively the tomographic imaging of the subject M may be performed at the first point $P_1$ that is the imaging position after the tomographic imaging of the subject M is performed at the second point $P_2$. Through the tomographic imaging of the subject M, the CT image of the subject M is obtained. As shown in FIG. 6a, the CT image of the subject M taken at the first point $P_1$ is denoted by C, and the CT image of the subject M taken at the second point $P_2$ is denoted by D.

Here, examples of the condition where the properties of the radiation source are not changed include the condition where the tube voltage and the tube current of the X-ray tube 2 are constant as in the first, second, and fourth embodiments. Therefore, while the tube voltage and the tube current at the time of the tomographic imaging are constant through before and after the tomographic imaging of the subject M, the tomographic imaging of the instrument I is performed. As in the first, second, and fourth embodiments, the condition where the properties of the radiation source are not changed is not limited to the condition where the tube voltage and tube current are constant. The condition for the properties of the radiation source may be set in accordance with the specification or type of the X-ray tube. Conditions where the properties of the radiation source are not changed other than the condition where the tube voltage and the tube current are constant have already been described in the first embodiment; therefore, no description of such conditions is given here.

As shown in FIG. 6b, a simulation CT image is obtained while moving the focal point of the X-ray tube 2 in a pseudo manner with the position of the table 3 fixed at the first point $P_1$ and the second point $P_2$ where the tomographic imaging is performed. The simulation CT image is denoted by E. Here, the simulation CT image corresponds to an image that results from enlarging or reducing a CT image C and a CT image D in accordance with the magnification varying due to the pseudo movement of the focal point of the X-ray tube 2.

In order to make the CT images identical in size to each other, matching between the simulation CT images E at the first point $P_1$ and the second point $P_2$ is performed while moving the focal point of the X-ray tube 2 in a pseudo manner with the position of the table 3 fixed at the first point $P_1$ and the second point $P_2$ where the tomographic imaging is performed. A distance between the focal point of the X-ray tube 2 and the rotation center axis Ax of the table 3 at the first point $P_1$ when the matching between the simulation CT images E at the first point $P_1$ and the second point $P_2$ is accomplished can be obtained as the distance SRD. A distance between the focal point of the X-ray tube 2 and the X-ray detector 4 when the matching between the simulation CT images E at the first point $P_1$ and the second point $P_2$ is accomplished is obtained as the distance SDD. Furthermore, the ratio SDD/SRD between the distances SRD, SDD is taken as the imaging magnification at the first point $P_1$.

By the method for calibrating an imaging magnification according to the fifth embodiment, as in the first to fourth embodiments, the distance SRD can be obtained based on (a) the size of the CT image of the target object (the subject M in the fifth embodiment) on the table 3 at the first point $P_1$ (that is the imaging position) and the size of the CT image of the target object (the subject M) on the table 3 at the second point $P_2$ (that is different from the first point $P_1$), and (b) the distance s between the rotation center axes Ax of the table 3 at the first point $P_1$ and the second point $P_2$. Furthermore, the distance SDD can be obtained by adding up the distance SRD thus obtained and (c) the distance between the X-ray detector 4 and the rotation center axis Ax of the table 3 at the first point $P_1$ (that is the imaging position), and the imaging magnification can be calibrated by taking the ratio between the distances SRD, SDD thus obtained as the imaging magnification at the first point $P_1$. As a result, even when the subject M that is subject to the tomographic imaging is used, the imaging magnification can be accurately calibrated.

As described above, in the fifth embodiment, an image (the CT image of the subject M) obtained through the tomographic imaging performed on the subject M serving as the target object that is subject to the tomographic imaging is provided for use in the calibration of the imaging magnification as in the third embodiment. Therefore, the CT image of the subject M is obtained through the tomographic imaging performed by the X-ray detector 4 with the subject M placed on the table 3 at the first point $P_1$. Further, the CT image of the subject M is obtained through the tomographic imaging performed by the X-ray detector 4 with the subject M placed on the table 3 at the second point $P_2$.

At this time, since the CT image of the subject M does not use the SRD, SDD to be calibrated, the CT image of the subject M is enlarged or reduced relative to the actual CT image of the subject M, as in the third embodiment. In other words, as described in the fourth embodiment, when the CT image is obtained based on accurately calibrated SRD, SDD, the CT image having actual dimensions can be obtained regardless of the position (imaging position) of table 3. However, SRD, SDD that have not been calibrated do not have correct values due to variations in the focal position of the radiation source (the X-ray tube 2 in the fifth embodiment). Therefore, when the SRD, SDD that have not been calibrated are used, the size of the CT image varies with the position (imaging position) of table 3.

Furthermore, as described in the third embodiment, since the subject M that is subject to the tomographic imaging is any subject M whose dimensions are unknown, it is not easy to obtain actual dimensions of the subject M only from the CT image of the subject M captured through the tomographic imaging performed by the X-ray detector 4. Therefore, the CT image C captured through the tomographic imaging performed by the X-ray detector 4 with the subject M placed on the table 3 at the first point $P_1$, and the CT image D captured through the tomographic imaging performed by the X-ray detector 4 with the subject M placed on the table 3 at the second point $P_2$ that is distanced from the first point $P_1$ by the distance s corresponding to the parameter of (b) are each obtained, and the following matching is performed to make the CT images identical in size to each other.

That is, the matching between the simulation CT images E at the first point $P_1$ and the second point $P_2$ is performed while moving the focal point of the radiation source (the X-ray tube 2 in the fifth embodiment) in a pseudo manner with the position of the table 3 fixed at the first point $P_1$ and the second point P₂ where the tomographic imaging is performed. The distance between the focal point of the radiation source (the X-ray tube 2) and the rotation center axis Ax of the table 3 at the first point P₁ when the matching between the simulation CT images E at the first point P₁ and the second point P₂ is accomplished can be accurately obtained as the distance SRD. The distance between the focal point of the radiation source (the X-ray tube 2) and the X-ray detector 4 when the matching between the simulation CT images E at the first point P₁ and the second point P₂ can be accurately obtained as the distance SDD only by adding up the distance SRD thus obtained and the distance corresponding to the parameter of (c) (that is, the distance between the X-ray detector 4 and the rotation center axis Ax of the table 3 at the first point P₁).

The present invention is not limited to the above embodiments, and may be modified as follows.

(1) In each of the above-described embodiments, description has been given using the X-rays as an example of the radiation and the X-ray computed tomography scanner as an example of the radiation computed tomography scanner; however, a radiation computed tomography scanner using radiation (α-rays, β-rays, γ-rays, or the like) other than the X-rays may be used.

(2) In each of the above-described embodiments, the distances SRD, SDD are each obtained by solving the above equation (5), but the present invention is not limited to this method. For example, at the time of calibration, the distance between the X-ray detector and the rotation center axis of the table at the first point is actually measured by a position detector (not shown), and the distance corresponding to this actual measurement value may be directly added to the distance SRD to obtain the distance SDD.

REFERENCE SIGNS LIST

1 X-ray computed tomography scanner
2 X-ray tube
3 table
4 X-ray detector
P₁ first point (imaging position)
P₂ second point
M subject
I calibration instrument (instrument)

The invention claimed is:

1. A method for calibrating an imaging magnification of a radiation computed tomography scanner, the radiation computed tomography scanner including a radiation source configured to emit radiation, a table on which a target object is placed, the table being rotatable about a rotation center axis and linearly movable in an emitting axis direction of the radiation between a first point that is an imaging position and a second point that is different from the first point, and a radiation detector facing the radiation source with the table interposed between the radiation detector and the radiation source, the radiation computed tomography scanner being configured to rotate the table about the rotation center axis to obtain a plurality of projection images and create a CT image, the method comprising:
    obtaining a distance SRD between a focal point of the radiation source and the rotation center axis of the table at the first point based on
        (a1) a size of a projection image or a CT image of the target object on the table at the first point and (a2) a size of a projection image or a CT image of the target object on the table at the second point, and
        (b) a distance between the rotation center axis of the table at the first point and the rotation center axis of the table at the second point;
    obtaining a distance SDD between the focal point of the radiation source and the radiation detector by adding up the distance SRD, and (c) a distance between the radiation detector and the rotation center axis of the table at the first point and the distance SRD thus obtained, and
    setting a ratio between the distances SRD, SDD as an imaging magnification at the first point.

2. The method for calibrating an imaging magnification of a radiation computed tomography scanner according to claim 1, wherein
    the distance of (c) is equal to a difference between a distance SDD at a calibration time (t) and a distance SRD at the calibration time (t), and
    the distances SRD, SDD are each obtained by solving an equation in which the difference is equal to a difference between an SDD calibrated at a time before the calibration time (t) and an SRD calibrated at the time.

3. The method for calibrating an imaging magnification of a radiation computed tomography scanner according to claim 1, wherein
    the projection image or the CT image is an image obtained before and after tomographic imaging of a subject.

4. The method for calibrating an imaging magnification of a radiation computed tomography scanner according to claim 1, wherein
    the CT image is an image of a calibration instrument obtained concurrently with tomographic imaging of a subject.

5. The method for calibrating an imaging magnification of a radiation computed tomography scanner according to claim 1, wherein
    the projection image is a projection image of a calibration instrument that is captured by the radiation detector with the calibration instrument placed on the table to make a relative position with respect to the rotation center axis known,
    the distance SRD is obtained by a geometric operation using
        a size corresponding to the (a1) of the projection image of the calibration instrument on the table at the first point and a size corresponding to the (a2) of the projection image of the calibration instrument on the table at the second point, and
        the distance of (b), and
    the distance SDD is obtained by adding up the distance SRD and the distance of (c).

6. The method for calibrating an imaging magnification of a radiation computed tomography scanner according to claim 1, wherein
    to obtain the distance SRD based on the image sizes of (a1), (a2) and the distance of (b),
    a relative position of a calibration instrument with respect to the rotation center axis is obtained from pixel coordinates of the calibration instrument reflected in the CT image captured through tomographic imaging performed by the radiation detector with the calibration instrument placed on the table at the first point,
    the projection image is a projection image of the calibration instrument captured by the radiation detector,
    the distance SRD is obtained by a geometric operation using
        a size corresponding to the (a1) of the projection image of the calibration instrument on the table at the first point and a size corresponding to the (a2) of the projection image of the calibration instrument on the table at the second point,
the distance of (b), and
(d) the relative position of the calibration instrument with respect to the rotation center axis, and
the distance SDD is obtained by adding up the distance SRD and the distance of (c).

7. The method for calibrating an imaging magnification of a radiation computed tomography scanner according to claim 1, wherein
to obtain the distance SRD based on the image sizes of (a1), (a2) and the distance of (b),
a structure of a subject is obtained from the CT image of the subject captured through tomographic imaging performed by the radiation detector with the subject placed on the table at the first point, the structure indicating a size corresponding to the (a1), (a2) of the CT image of the subject captured at the first point,
the projection image is
(A) an actually measured projection image that is projected from the structure of the subject and captured by the radiation detector with the table positioned at the second point that is distanced from the first point by the distance of (b), and
(B) a simulation projection image that is projected from the structure of the subject with the table positioned at the second point that is distanced from the first point by the distance of (b) while moving the focal point of the radiation source in a pseudo manner,
matching between the actually measured projection image of (A) and the simulation projection image of (B) is performed while moving the focal point of the radiation source in a pseudo manner to make the actually measured projection image of (A) and the simulation projection image of (B) identical in size to each other,
a distance between the focal point of the radiation source and the rotation center axis of the table at the first point when the matching between the simulation projection image of (B) and the actually measured projection image of (A) is accomplished is obtained as the distance SRD, and
a distance between the focal point of the radiation source and the radiation detector when the matching between the simulation projection image of (B) and the actually measured projection image of (A) is accomplished is obtained as the distance SDD by adding up the distance SRD and the distance of (C).

8. The method for calibrating an imaging magnification of a radiation computed tomography scanner according to any one of claim 1, wherein
the CT image is a CT image of a calibration instrument that is captured through tomographic imaging performed by the radiation detector with the calibration instrument placed on the table,
the distance SRD is obtained by a geometric operation using
a size corresponding to the (a1) of the CT image of the calibration instrument on the table at the first point and a size corresponding to the (a2) of the CT image of the calibration instrument on the table at the second point, and
the distance of (b), and
the distance SDD is obtained by adding up the distance SRD and the distance of (c).

9. The method for calibrating an imaging magnification of a radiation computed tomography scanner according to claim 1, wherein
the CT image is
(C) a CT image captured through tomographic imaging performed by the radiation detector with a subject placed on the table at the first point, and
(D) a CT image captured through tomographic imaging performed by the radiation detector with the subject placed on the table at the second point that is distanced from the first point by the distance of (b),
matching between simulation CT images of (E) at the first point and the second point is performed while moving the focal point of the radiation source in a pseudo manner with a position of the table fixed at each of the first point and the second point where the tomographic imaging is performed to make the CT images identical in size to each other,
a distance between the focal point of the radiation source and the rotation center axis of the table at the first point when the matching between the simulation CT images of (E) at the first point and the second point is accomplished is obtained as the distance SRD, and
a distance between the focal point of the radiation source and the radiation detector when the matching between the simulation CT images of (E) at the first point and the second point is accomplished is obtained as the distance SDD by adding up the distance SRD and the distance of (C).

* * * * *